US011726840B2

(12) United States Patent
Habti et al.

(10) Patent No.: US 11,726,840 B2
(45) Date of Patent: Aug. 15, 2023

(54) FLEXIBLE AND SCALABLE ARTIFICIAL INTELLIGENCE AND ANALYTICS PLATFORM WITH ADVANCED CONTENT ANALYTICS AND DATA INGESTION

(71) Applicant: OPEN TEXT SA ULC, Halifax (CA)

(72) Inventors: Norddin Habti, Montreal (CA); Steve Pettigrew, Montreal (CA); Martin Brousseau, Mont-Saint-Hilaire (CA); Lalith Subramanian, San Mateo, CA (US)

(73) Assignee: Open Text SA ULC, Halifax (CA)

( * ) Notice: Subject to any disclaimer, the term of this patent is extended or adjusted under 35 U.S.C. 154(b) by 1196 days.

(21) Appl. No.: 16/296,015

(22) Filed: Mar. 7, 2019

(65) Prior Publication Data

US 2019/0279101 A1     Sep. 12, 2019

Related U.S. Application Data

(60) Provisional application No. 62/639,899, filed on Mar. 7, 2018.

(51) Int. Cl.
*G06F 16/20* (2019.01)
*G06F 9/54* (2006.01)
(Continued)

(52) U.S. Cl.
CPC ............ *G06F 9/541* (2013.01); *G06F 16/221* (2019.01); *G06F 16/2456* (2019.01);
(Continued)

(58) Field of Classification Search
CPC .......... G06N 20/00; G06N 5/04; G06F 9/541; G06F 16/27; G06F 16/84; G06F 16/221; G06F 16/252; G06F 16/2456
See application file for complete search history.

(56) References Cited

U.S. PATENT DOCUMENTS 9,037,613 B2* 5/2015 Green ................... G06F 16/258
707/809
10,552,442 B1 2/2020 Lusk et al.
(Continued)

FOREIGN PATENT DOCUMENTS

WO     WO-2009035618 A2 *  3/2009  ......... G06F 17/2785

OTHER PUBLICATIONS

International Search Report and Written Opinion issued for PCT Application No. PCT/IB2019/051861, dated Jun. 27, 2019, 17 pages.

(Continued)

*Primary Examiner* — Tarek Chbouki
(74) *Attorney, Agent, or Firm* — Sprinkle IP Law Group

(57) ABSTRACT

Disclosed is a flexible and scalable artificial intelligence and analytics platform with advanced content analytics and content ingestion. Disparate contents can be ingested into a content analytics system of the platform through a content ingestion pipeline operated by a sophisticated text mining engine. Prior to persistence, editorial metadata can be extracted and semantic metadata inferred to gain insights across the disparate contents. The editorial metadata and the semantic metadata can be dynamically mapped, as the disparate contents are crawled from disparate sources, to an internal ingestion pipeline document conforming to a uniform mapping schema that specifies master metadata of interest. For persistence, the semantic metadata in the internal ingestion pipeline document can be mapped to metadata tables conforming to a single common data model of a central repository. In this way, ingested metadata can be leveraged across the platform, for instance, for trend analysis, mood detection, model building, etc.

20 Claims, 11 Drawing Sheets

(51) Int. Cl.
    *G06F 16/27*     (2019.01)
    *G06N 20/00*     (2019.01)
    *G06F 16/22*     (2019.01)
    *G06F 16/25*     (2019.01)
    *G06F 16/2455*     (2019.01)
    *G06F 16/84*     (2019.01)
    *G06N 5/04*     (2023.01)

(52) U.S. Cl.
    CPC ............ *G06F 16/252* (2019.01); *G06F 16/27* (2019.01); *G06F 16/84* (2019.01); *G06N 5/04* (2013.01); *G06N 20/00* (2019.01)

(56) References Cited

U.S. PATENT DOCUMENTS

| | | | |
|---|---|---|---|
| 2002/0165872 A1* | 11/2002 | Meltzer | G06Q 20/10 715/205 |
| 2003/0110176 A1* | 6/2003 | Morgan | G06F 16/258 |
| 2007/0168354 A1 | 7/2007 | Ramer et al. | |
| 2008/0077598 A1* | 3/2008 | Wilmering | G06F 16/367 |
| 2008/0306984 A1* | 12/2008 | Friedlander | G06F 16/23 707/999.102 |
| 2010/0169351 A1 | 7/2010 | Kulkarni et al. | |
| 2010/0174696 A1 | 7/2010 | Dixon et al. | |
| 2013/0024440 A1* | 1/2013 | Dimassimo | G06F 16/248 707/706 |
| 2013/0104150 A1 | 4/2013 | Rdzak et al. | |
| 2013/0291121 A1 | 10/2013 | Iovanov et al. | |
| 2014/0074845 A1* | 3/2014 | Dimassimo | G06F 16/951 707/739 |
| 2014/0297809 A1 | 10/2014 | Kim | |
| 2015/0081658 A1 | 3/2015 | Meyles et al. | |
| 2015/0189005 A1* | 7/2015 | Dubois | H04L 63/0407 709/217 |
| 2015/0201015 A1 | 7/2015 | Chu et al. | |
| 2015/0261831 A1 | 9/2015 | Murthy et al. | |
| 2016/0179933 A1 | 6/2016 | Dimassimo et al. | |
| 2016/0350774 A1 | 12/2016 | Brooks et al. | |
| 2017/0213157 A1* | 7/2017 | Bugay | G06F 16/3329 |
| 2018/0225163 A1 | 8/2018 | Azcona Rivas | |
| 2019/0278635 A1 | 9/2019 | Sierra et al. | |
| 2019/0362024 A1 | 11/2019 | Brousseau et al. | |
| 2020/0117756 A1 | 4/2020 | Garimella et al. | |
| 2020/0117757 A1 | 4/2020 | Yanamandra et al. | |
| 2020/0159731 A1 | 5/2020 | Gino et al. | |
| 2020/0210490 A1 | 7/2020 | Hutchins | |
| 2020/0210521 A1 | 7/2020 | Hutchins | |
| 2020/0242508 A1 | 7/2020 | Bonnin et al. | |

OTHER PUBLICATIONS

International Search Report and Written Opinion issued for PCT Application No. PCT/IB2019/051860, dated Jun. 27, 2019, 7 pages.
Office Action issued for U.S. Appl. No. 16/295,379, dated Jul. 22, 2020, 8 pages.
International Preliminary Report on Patentability (IPRP) issued for PCT International PCT Application No. PCT/IB2019/051861, dated Sep. 17, 2020, 8 pages.
International Preliminary Report on Patentability (IPRP) issued for PCT International PCT Application No. PCT/IB2019/051860, dated Sep. 17, 2020, 6 pages.
European Search Report issued for European Patent Application No. 19763584.0, dated Nov. 22, 2021, 8 pages.

* cited by examiner

| NAMED ENTITY | |
|---|---|
| 🔑 doc_id | BIGINT |
| 🔑 entity_index | NUMERIC( ) |
| id | CHARACTER VARYING( ) |
| cartridge | CHARACTER VARYING( ) |
| confidence_score | NUMERIC( ) |
| relevancy_score | NUMERIC( ) |
| frequency | NUMERIC( ) |
| subjectivity | CHARACTER VARYING( ) |
| subjectivity_confidence_score | NUMERIC( ) |
| subjectivity_score | NUMERIC( ) |
| subjectivity_distribution | NUMERIC( ) |
| tone | CHARACTER VARYING( ) |
| tone_confidence_score | NUMERIC( ) |
| positive_tone_score | NUMERIC( ) |
| positive_tone_distribution | NUMERIC( ) |
| negative_tone_score | NUMERIC( ) |
| negative_tone_distribution | NUMERIC( ) |
| normalized_name | CHARACTER VARYING( ) |
| client_normalized_name | CHARACTER VARYING( ) |
| main_entity_language_code | CHARACTER VARYING( ) |
| main_entity_value | CHARACTER VARYING( ) |

| SUB ENTITY | |
|---|---|
| 🔑 doc_id | BIGINT |
| 🔑 entity_index | NUMERIC( ) |
| 🔑 sub_entity_index | NUMERIC( ) |
| id | CHARACTER VARYING( ) |
| name | CHARACTER VARYING( ) |
| begin_index | NUMERIC( ) |
| end_index | NUMERIC( ) |
| candidate | NUMERIC( ) |
| subjectivity | CHARACTER VARYING( ) |
| subjectivity_confidence_score | NUMERIC( ) |
| subjectivity_score | NUMERIC( ) |
| tone | CHARACTER VARYING( ) |
| tone_confidence_score | NUMERIC( ) |
| positive_tone_score | NUMERIC( ) |
| negative_tone_score | NUMERIC( ) |
| sentence_begin_index | NUMERIC( ) |
| sentence_end_index | NUMERIC( ) |
| sentence | TEST |

FROM FIG. 6A

FIG. 6B

FLEXIBLE AND SCALABLE ARTIFICIAL INTELLIGENCE AND ANALYTICS PLATFORM WITH ADVANCED CONTENT ANALYTICS AND DATA INGESTION

CROSS-REFERENCE TO RELATED APPLICATION(S)

This application claims a benefit of priority under 35 U.S.C. § 119(e) from the filing date of U.S. Provisional Application No. 62/639,899, filed Mar. 7, 2018, entitled "FLEXIBLE AND SCALABLE ARTIFICIAL INTELLIGENCE AND ANALYTICS PLATFORM WITH ADVANCED CONTENT ANALYTICS AND DATA INGESTION," the entire disclosure of which is fully incorporated by reference herein for all purposes.

TECHNICAL FIELD

This disclosure relates generally to content analytics. More particularly, this disclosure relates to systems, methods, and computer program products for a flexible and scalable artificial intelligence and analytics platform with advanced content analytics and content ingestion.

BACKGROUND OF THE RELATED ART

Today's enterprises are continuously bombarded with massive amounts of data (e.g., unstructured digital content) from disparate sources. In many scenarios, real-time responses and data solutions are needed to make sense and make use of such content. Accordingly, enterprises today generally rely on technologies to process, understand, and utilize enterprise content. Content analytics is one such technology.

Content analytics refers to the act of applying business intelligence (BI) and business analytics (BA) practices to digital content. Enterprises use content analytics software to gain insight and provide visibility into the amount of enterprise content that is being created, the nature of that content, and how it is used, for instance, in an enterprise computing environment.

Content analytics software such as OpenText™ InfoFusion Content Analytics, which is available from Open Text, headquartered in Canada, as part of the OpenText™ Information Access Platform, can provide many benefits, including creating machine-readable content from unstructured content, extracting meaningful and/or relevant content from the unstructured content, discovering valuable factual information from the unstructured content, increasing productivity by significantly reducing the time required to identify what content should be kept (e.g., for compliance reasons, which can also reduce legal risk), and so on.

While existing content analytics software can be quite powerful and useful in many applications, they may not scale well due to how data is ingested and stored for use by the content analytics software. That is, the scalability of existing content analytics systems, in some cases, can be limited by the scalability of the underlying databases where content under analysis is actually stored. Consequently, there is room for innovations and improvements in the field of content analytics.

SUMMARY OF THE DISCLOSURE

Embodiments disclosed herein provide innovations and improvements in the field of content analytics. An object of the invention is to provide a technical solution that delivers artificial intelligence (AI), machine learning (ML), data discovery, task automation, business optimization, and sophisticated dashboarding that enables enterprises to make smart and speedy decisions with their data. In some embodiments, this object can be realized in a flexible and scalable AI and analytics platform ("platform") with advanced content analytics, data ingestion, and reporting/sharing functions. The platform, which includes hardware and software, combines ML, advanced analytics, enterprise-grade BI, and capabilities to acquire, merge, manage, and analyze structured and unstructured big data, including big content stored in Enterprise Information Management (EIM) systems. The platform enables machine-assisted decision making, automation, and business optimization.

In some embodiments, the platform (e.g., OpenText™ Magellan) includes a sophisticated text mining engine within a content analytics system (e.g., OpenText™ Magellan Text Mining). The text mining engine is operable to ingest disparate contents through a content ingestion pipeline. The disparate contents can obtained or received from disparate content sources (e.g., social media applications, Web sites, enterprise repositories, etc.) through disparate crawlers (e.g., social media crawler(s), Web crawler(s), repository crawler(s), etc.). In some embodiments, the disparate crawlers are operable to extract the editorial metadata and store the editorial metadata in source-specific metadata tables, which can be defined by source-specific schemas.

In some embodiments, the disparate contents can be ingested in a process that includes extracting editorial metadata from the disparate contents, inferring semantic metadata from the disparate contents, and dynamically mapping the editorial metadata and the semantic metadata to an internal ingestion pipeline document. In some embodiments, elements of the internal ingestion pipeline document are specified in a uniform mapping schema for capturing a set of master metadata of interest. In some embodiments, the uniform mapping schema can be extended to include custom extensions for capturing custom attributes in the internal ingestion pipeline document. Such custom attributes may vary from use case to use case.

In some embodiments, the process can further include mapping the semantic metadata in the internal ingestion pipeline document to metadata tables so that the semantic metadata can be persisted in a central repository. The metadata tables conforms to a single common data model of the central repository. The single common data model defines a document table that associates the editorial metadata extracted from the disparate contents and the semantic metadata inferred from the disparate contents. Because the central repository is accessible by various systems (e.g., OpenText™ Magellan Data Discovery, OpenText™ Magellan Analytics Suite, OpenText™ Magellan Analytics Designer, OpenText™ Magellan BI & Reporting) of the platform, this allows the ingested metadata (including the editorial metadata and the inferred semantic metadata) to be leveraged (e.g., through the common document table) by users of these systems across the platform.

In some embodiments, the disparate contents can include at least two types of textual content, audio content, image content, social media content, Web content, or enterprise content in the same language or different languages. In some embodiments, the disparate data sources can include at least two of a social media application, a social media site, a Web site, a Web application, a desktop application, a mobile application, an enterprise repository, a fileshare, an enterprise content management (ECM) system, an EIM system, an enterprise-class system, or an Internet-enabled device.

In some embodiments, the text mining engine is operable to infer the semantic metadata from the disparate contents utilizing a plurality of text mining functions, the plurality of text mining functions comprising language detection, concept extraction, categorization, topic, classification, sentiment analysis, summarization, or entity extraction. Accordingly, in some embodiments, the semantic metadata inferred from the disparate contents can include, for instance, language, concepts, categories/topics/classifications, document-level sentiments, sentence-level sentiments, summaries, named entities, sub entities, etc.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIGS. 6A-6B depict a diagrammatic representation of a common data model according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
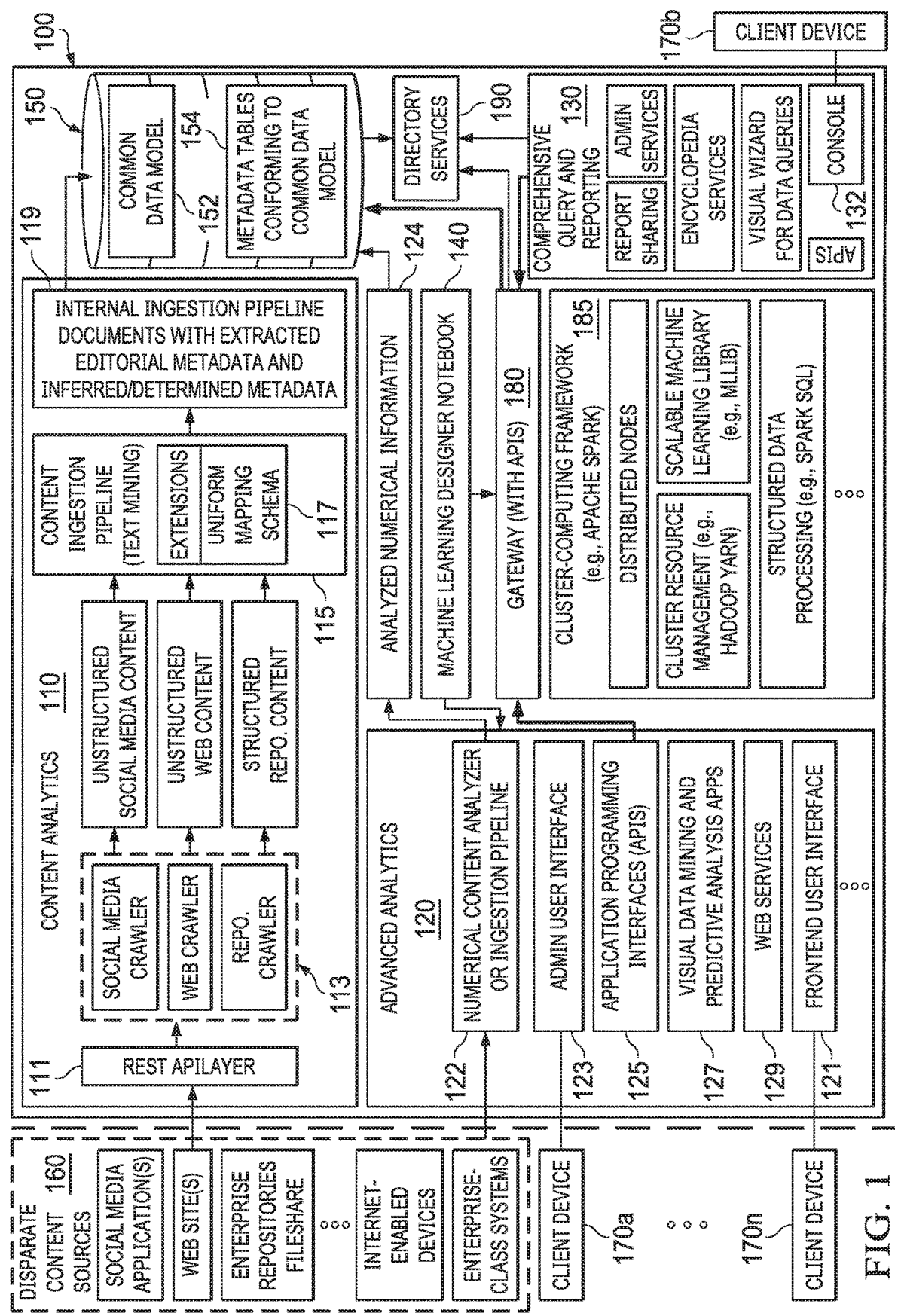
FIG. 1 depicts a diagrammatic representation of a network computing environment where embodiments of a flexible and scalable AI and analytics platform disclosed herein can be implemented.

FIG. 1 depicts a diagrammatic representation of a network computing environment where embodiments of a flexible and scalable AI and analytics platform disclosed herein can be implemented. As illustrated in FIG. 1, in some embodiments, platform 100 operates in a network computing environment to provide a plurality of services to client devices 170a, 170b, ... 170n. In this example, platform 100 includes content analytics system 110, advanced analytics system 120, comprehensive query and reporting system 130, and developer platform 140 for advanced users such as data scientists, data analysts, ML modelers, etc. Since platform 100 can operate as one cohesive system, systems 110, 120, 130, 140 can be considered as subsystems of platform 100.

Content analytics system 110 can be communicatively connected to a variety of disparate content sources 160, including those that are internal and/or external to platform 100. In the example of FIG. 1, content analytics system 110 is operable to obtain various types of content, including unstructured contextual content, in one or more languages (e.g., English, French, Spanish, German, etc.) from social media applications, Web sites, enterprise repositories fileshare, etc. Examples of social media applications can include TWITTER, FACEBOOK, LINKEDIN, etc. Social media applications and Web sites are known to those skilled in the art and thus are not further described herein. Additional examples of disparate content sources 160 can include any EIM system, content server, ECM, Internet-enabled devices such as Internet of Things (IoT) devices, enterprise-class systems such as enterprise resources planning (ERP) systems, enterprise planning systems, customer relationship management systems, etc.

Content analytics system 110 can include crawler layer 113 having various crawlers configured for communicating with disparate content sources 160 through REST application programming interface (API) layer 111. For instance, a social media crawler may be configurable for obtaining and/or receiving unstructured social media content from a social media application. This can include posts, comments, likes, images, links, or any content (whether it is automatically generated content or user generated content) that can be crawled from a social media application. Output from the social media crawler is considered unstructured social media content which can be in disparate formats.

As another example, a Web crawler may be configured for communicating with Web server(s) through REST API layer 111 to obtain and/or receive unstructured Web content from the Internet. Likewise, a repository crawler may be configured for obtaining and/or receiving structured enterprise content from an enterprise repository or fileshare. Other crawlers are also possible and can be readily added (e.g., by adding a plug-in particular to the data type such as transcribed voice/audio data, image data, etc.) to content analytics system 110, making platform 100 flexible and extensible with regards to content sources and types and not limited to any specific enterprise system, social media, or Web site on the Internet.

Figure 5:
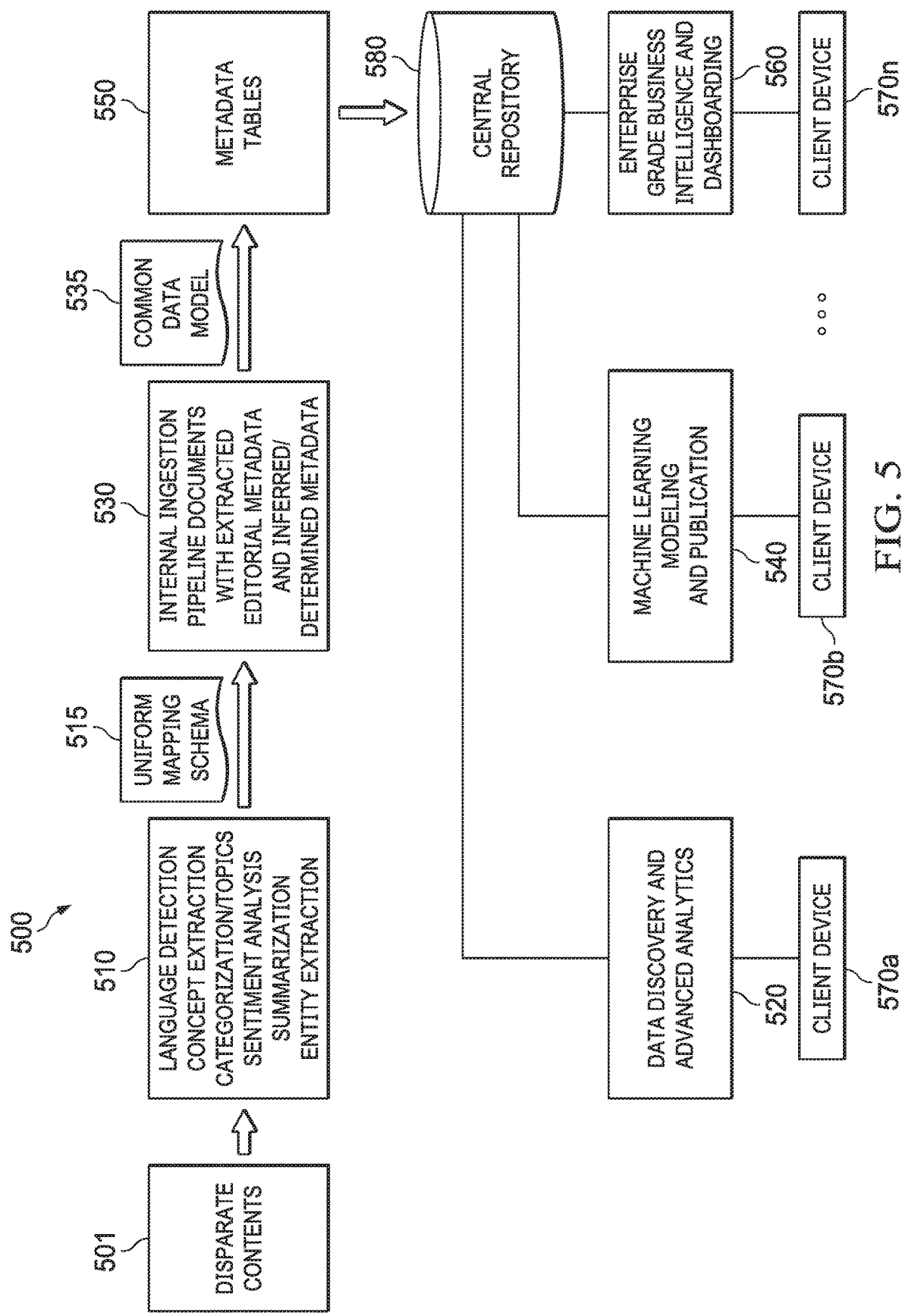
FIG. 5 depicts a diagrammatic representation of a process flow for determining/inferring semantic metadata from disparate contents and persisting the semantic metadata in a central repository accessible across a flexible and scalable AI and analytics platform according to some embodiments.

As illustrated in FIG. 1, the unstructured content (from various input sources and in different formats and/or languages) is provided to content ingestion pipeline 115 for processing (e.g., language detection, content extraction, content analyzing, tagging, etc.). In some embodiments, content ingestion pipeline 115 supports configuring and chaining of processors to form an ingestion pipeline and, as further described below with reference to FIG. 5, is operable to process textual content and derive semantic metadata from the textual content through these chained processors. In some embodiments, textual content and numerical information contained in a piece of content can be processed separately and differently. For example, a meaning or sentiment can be extracted and/or derived from the textual data (e.g., a text string of 140 characters or less) in the content, while a separate numerical analysis can be performed on numerical information in the content. This is further described below.

In some embodiments, content ingestion pipeline 115 can decompose inputs of various content types from various content sources into respective source-specific metadata tables, map them to internal ingestion pipeline document 119, populate internal ingestion pipeline document 119 with inferred/derived/determined metadata utilizing uniform mapping schema 117 (with or without custom extensions, depending upon use case), and persist them in central repository 150 through metadata tables 154 that conform to single common data model 152 of central repository 150. Central repository 150 is accessible by other systems and/or services running on platform 100, including directory service 190 (e.g., OpenText Directory Service), as shown in FIG. 1.

In some embodiments, a numerical analysis on the input data can be performed by numerical content analyzer or ingestion pipeline 122 within advanced analytics system 120. The output data from the numerical analysis (e.g., analyzed numerical information 124) can be mapped to the persistence layer (which, for instance, can include metadata table(s) 154 residing in central repository 150) utilizing the same or similar mapping scheme disclosed herein for the textual content. Additionally or alternatively, the numerical content analyzing functionality may be implemented in an enhanced SPARK gateway described below (e.g., gateway 180).

As illustrated in the example of FIG. 1, advanced analytics system 120 can include administrative user interface (UI) 123 configured for system administrators, APIs 125 for the UIs and applications (e.g., Web service APIs for delivering analytics software as Web services 129, REST APIs for the UIs, APIs for communication with an in-memory columnar database and gateway 180, etc.), visual data mining and predictive analysis applications 127, and frontend UI 121 configured for end users, etc.

In some embodiments, advanced analytics system 120 can leverage custom data models created by data scientists in distributed cluster-computing framework 185 and present them as drag-and-drop models. This allows even non-programmer users to apply advanced algorithms to their data to learn likely behaviors, forecast outcomes, anticipate risk, and make recommendations. For instance, predictive analysis applications 127, which can be provided to client devices 170a . . . 170n as Web services 129 through frontend UI 121, can include built-in analytic techniques, such as profiling, mapping, clustering, forecasting, creating decision trees, and so on, without requiring statistical expertise or coding.

In some embodiments, APIs 125 can include a database (DB) API particularly configured for columnar database algorithms to access unstructured and/or structured data persisted in proprietary columnar databases in central repository 150. As shown in FIG. 1, platform 100 further includes gateway 180 that serves as a gatekeeper of distributed cluster-computing framework 185 (e.g., APACHE SPARK) for large-scale data processing and ML. APACHE SPARK provides in-memory computing for maximizing hardware capabilities and requires a cluster resource manager (e.g., HADOOP YARN) and a distributed storage system (e.g., Hadoop distributed file system (HDFS)). As a non-limiting example, APACHE HADOOP software framework can be used for distributed storage and processing of datasets of big data. Skilled artisans appreciate that "big data" refers to data sets that are so voluminous and complex (and sometimes that grow rapidly) that traditional data processing software is inadequate to process them. In order to have certain big data analytics features (which will not run on the Spark (Parquet) database format) run on the datasets, the datasets may first be translated from the Parquet database format to a proprietary columnar database format. Through gateway 180, data scientists can leverage distributed cluster-computing framework 185 to create and process custom ML algorithms using programming languages such as Scala, Python, SQL, and R.

The distributed storage system of distributed cluster-computing framework 185, which can store analytical outputs from advanced analytics system 120 and/or metadata outputs from content analytics system 110, is accessible by comprehensive query and reporting system 130 through gateway 180. In some embodiments, services and functions provided by comprehensive query and reporting system 130 (e.g., a visual data query wizard, a report sharing/saving function, administrative services, encyclopedia services, etc.) allow high volumes of users to (e.g., through information console 132) design, deploy, and manage secure, interactive Web applications, reports, and dashboards fed by multiple, disparate content sources 160. Comprehensive query and reporting system 130 can further include integration APIs that enable analytic content to be embedded in any application and displayed on any device.

Comprehensive query and reporting system 130 can provide its users with reliable findings and deep insights and do so in a visually compelling way that is easy to understand and ready to be act on. Comprehensive query and reporting system 130 can include a BI reporting feature through which users can create their own dashboards (referred to as dashboarding), reports, visualizations, and so on from insights developed in other components of the platform (e.g., content analytics system 110, advanced analytics system 120, etc.) and easily share or embed them where needed.

Conventional columnar databases could not scale to allow processing of large amounts of data (e.g., hundreds or more gigabytes of data). Thus, a new platform is needed. Architecturally, the platform (e.g., platform 100) disclosed herein combines content ingestion and enrichment (e.g., content analytics system 110), big data analytics (BDA) (e.g., advanced analytics system 120), information management and dashboarding (e.g., comprehensive query and reporting system 130), and ML model development environment (e.g., ML Designer Notebook 140) in a comprehensive, intelligent, and seamless manner. For instance, the platform utilizes HADOOP and SPARK to scale to larger data sets and perform analytics. The platform also added a ML Designer Notebook feature (which, in one embodiment, can be based on the JUPYTER Notebook paradigm). The ML Designer Notebook can approximate a developer platform and ML modeling environment that is familiar to data scientists, ML modelers, and the like, which can reduce the learning curve and help them get to work on their models right away. Further, in addition to structured content managed by information management systems, such as content servers, EIM systems, ECM systems, etc., the platform includes an enhanced content ingestion pipeline (e.g., content ingestion pipeline 115) that can ingest social media and Web data feeds so as to allow the advanced analytics system to incorporate textual data (unstructured data).

To make it all work seamlessly, a variety of problems must be solved, including, but are not limited to, integration, combining numerical data with textual information for modeling, creating reusable and extendable custom data models, solving practical issues such as how to compute a mean for huge data sets in real-time that's "good enough." To solve these problems, the platform provides a variety of solutions, including a uniform mapping schema and a single common data model for mapping both unstructured text and structured data. The uniform mapping schema is utilized by the advanced content ingestion pipeline to create internal ingestion pipeline documents which are then mapped to metadata tables using the single common data model. Because disparate contents can now be processed and persisted in a unified manner, this allows users of the advanced analytics system to build and train data models for predictive analytics using ML, with unstructured text and structured data as input data. Further, the advanced content ingestion pipeline can filter out content using rules to detect certain kinds of information from various sources and then exclude or persist the detected information. Examples and details for intelligent content filtering during content ingestion and prior to persistence can be found in U.S. patent application Ser. No. 11,163,840, entitled "SYSTEMS AND METHODS FOR INTELLIGENT CONTENT FILTERING AND PERSISTENCE," which is incorporated by reference herein. This way, content can be better managed and used across the platform.

In some embodiments, the advanced content ingestion pipeline can be enhanced both at the input end and at the output end. At the input end, the advanced content ingestion pipeline is configured with a scalable Web crawler capable of crawling Web sites on the Internet with a high volume of content or for a large number of Web sites in parallel. In some embodiments, the scalable Web crawler can be a HyperText Transfer Protocol (HTTP) crawler, preferably based on an industry standard like APACHE NUTCH. APACHE NUTCH is a highly extensible and scalable open source Web crawler software project. Any suitable scalable Web crawler can be plugged into the platform and send content to the data ingestion pipeline. As discussed above, the advanced content ingestion pipeline can be configured with a variety of crawlers for crawling a variety of types of content from a variety of data sources.

In some embodiments, the advanced content ingestion pipeline can also be enhanced at the output end with a communication path to the advanced analytics system. Rather than using a REST interface to call a content analytics service, which cannot scale beyond modest volumes, the advanced content ingestion pipeline is built with an ingestion pipeline API.

The platform requires the ability to store a flexible set of metadata, since the content (e.g., a tweet) can be very rich in data (e.g., location, country, language, etc.) that should be available for analysis. To this end, the content analytics system implements an extensible metadata schema containing a set of attributes that it can map from the content (e.g., crawler documents or messages, etc.). The content analytics system further includes an ability to segregate information by source/protocols or application identifier. The content analytics system uses an adapter that is based on the ingestion pipeline API to store the metadata to the central repository (which can be a relational databases management system (RDBMS), HDFS, data lake, data store, etc., depending upon use case).

As described above, ingested data (which is persisted in the central repository according to the single common data model of the central repository) is accessible for consumption across the platform, including the advanced analytics system and the comprehensive query and reporting system. In turn, these systems can also input numerical data that comes through them into the single common data model. For instance, the comprehensive query and reporting system can perform traditional BI analytics and the advanced analytics system can perform advance modeling. Numerical outputs from the analytics can be inserted by these systems into metadata tables conforming to the single common data model and persisted in the central repository.

As also described above, the ML model development environment can be used by data scientists, data analysts, ML modelers, etc. They can potentially modify the data, but they may mostly consume that data to train, validate, and use models (e.g., ML based models and some particular purpose models). U.S. Pat. No. 10,565,603, which is incorporated by reference herein, provides an example of a ML model that can be run on the platform for smart clustering and segmentation against customer digital data, useful in understanding customer behavior, grouping, targeting, messaging, etc. Additional examples can be found in U.S. Patent Application Publication Ser. No. 16/262,170 US 2020/0242508 A1, entitled "MACHINE LEARNING MODEL PUBLISHING SYSTEMS AND METHODS," which is incorporated by reference herein.

The unified mapping schema and the single common data model together define how disparate contents would be mapped (e.g., dynamically mapped as they are crawled) and persisted in metadata tables and how they are related to each other. Through the ML model development environment, the data scientists may augment and/or incorporate other features into the metadata tables, potentially mutating and/or modifying the metadata tables depending on the kind of analysis and/or modeling that they are building. In this way, the platform flexibly enables the data scientists to use the platform the way they want to.

The unified mapping schema, the internal ingestion pipeline document, and the single common data model will now be described in more details with reference to FIGS. 2-9.

While the platform utilizes a single common data model to persist metadata that can be inferred/derived/determined from disparate contents obtained/received from disparate sources, the disparate contents themselves may conform to different data models and/or database schemas. For instance, social media content (which can be obtained by one or more social media crawlers through real-time data feeds) may be handled through a stream-processing platform (e.g., APACHE KAFKA®) with a scalable message queue, from which the social media content can be fed (e.g., through a feeder functionality) to the content ingestion pipeline.

Such social media content can be in a file format that uses human-readable text to transmit data objects consisting of attribute-value pairs and array datatypes. An example of a suitable data-interchange format is the JavaScript Object Notation (JSON) file format. Below is a non-limiting example of a JSON file that may be placed in the message queue of the stream-processing platform by a social media crawler.

```
{
    "job_id": 1,
    "group_name": "...",
    "pipeline_custom_properties": {
        "product": "...",
        "customer": "...",
        "type": "demo"
    },
    "tweets": [
        {
            "created_at": "Wed Feb 13 20:00:18 +0000 2019",
            "id": ...,
            "id_str": "...",
            "text": "Cool!!!! https://...",
            "truncated": false,
            "entities": {
                "hashtags": [ ],
                "symbols": [ ],
                "user_mentions": [ ],
                "urls": [
                    {
                        "url": "https://...",
                        "expanded_url": "https://...",
                        "display_url": "...",
                        "indices": [
                            9,
                            32
                        ]
                    }
                ]
            },
            "metadata": {
                "iso_language_code": "en",
                "result_type": "recent"
            },
            "source": "<a href=\"http://www.facebook.com/twitter\" rel=\"nofollow\">Facebook</a>",
            "in_reply_to_status_id": null,
            "in_reply_to_status_id_str": null,
            "in_reply_to_user_id": null,
            "in_reply_to_user_id_str": null,
            "in_reply_to_screen_name": null,
            "user": {
                "id": ...,
                "id_str": "...",
                "name": "...",
                "screen_name": "...",
                "location": "...",
                "description": "...",
                "url": "https://...",
                "entities": {
                    "url": {
                        "urls": [
                            {
                                "url": "https://...",
                                "expanded_url": "http://...",
                                "display_url": "...",
                                "indices": [
                                    0,
                                    23
                                ]
                            }
                        ]
                    },
                    "description": {
                        "urls": [ ]
                    }
                },
                "protected": false,
                "followers_count": 497,
                "friends_count": 2038,
                "listed_count": 17,
                "created_at": "Thu Feb 12 17:13:34 +0000 2009",
                "favourites_count": 349,
                "utc_offset": null,
                "time_zone": null,
                "geo_enabled": true,
                "verified": false,
                "statuses_count": 13927,
                "lang": "en",
                "contributors_enabled": false,
                "is_translator": false,
                "is_translation_enabled": false,
                "profile_background_color": "FFF04D",
                "profile_background_image_url": "http://...",
                "profile_background_image_url_https": "https://...",
                "profile_background_tile": false,
                "profile_image_url": "http://...",
                "profile_image_url_https": "https://...",
                "profile_banner_url": "https://...",
                "profile_link_color": "0099CC",
                "profile_sidebar_border_color": "FFF8AD",
                "profile_sidebar_fill_color": "F6FFD1",
                "profile_text_color": "333333",
                "profile_use_background_image": true,
                "has_extended_profile": true,
                "default_profile": false,
                "default_profile_image": false,
                "following": false,
                "follow_request_sent": false,
                "notifications": false,
                "translator_type": "none"
            },
            "geo": null,
            "coordinates": null,
            "place": null,
            "contributors": null,
            "is_quote_status": false,
            "retweet_count": 0,
            "favorite_count": 0,
            "favorited": false,
            "retweeted": false,
            "possibly_sensitive": false,
            "lang": "en"
        }
    ]
}
```

Figure 2:
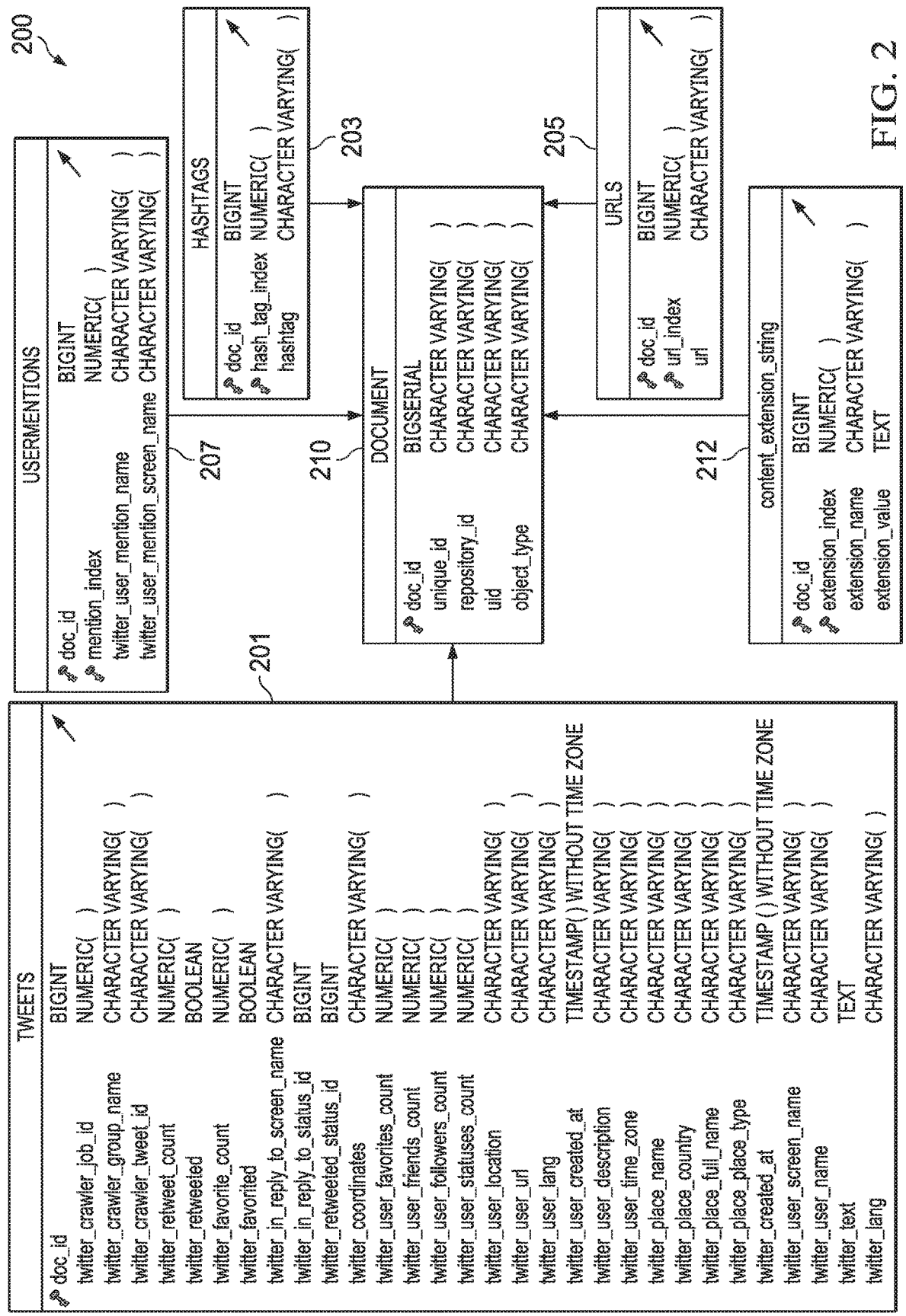
FIG. 2 depicts a diagrammatic representation of an example of a social media data model for storing editorial metadata that can be extracted from social media content.
Figure 6A:
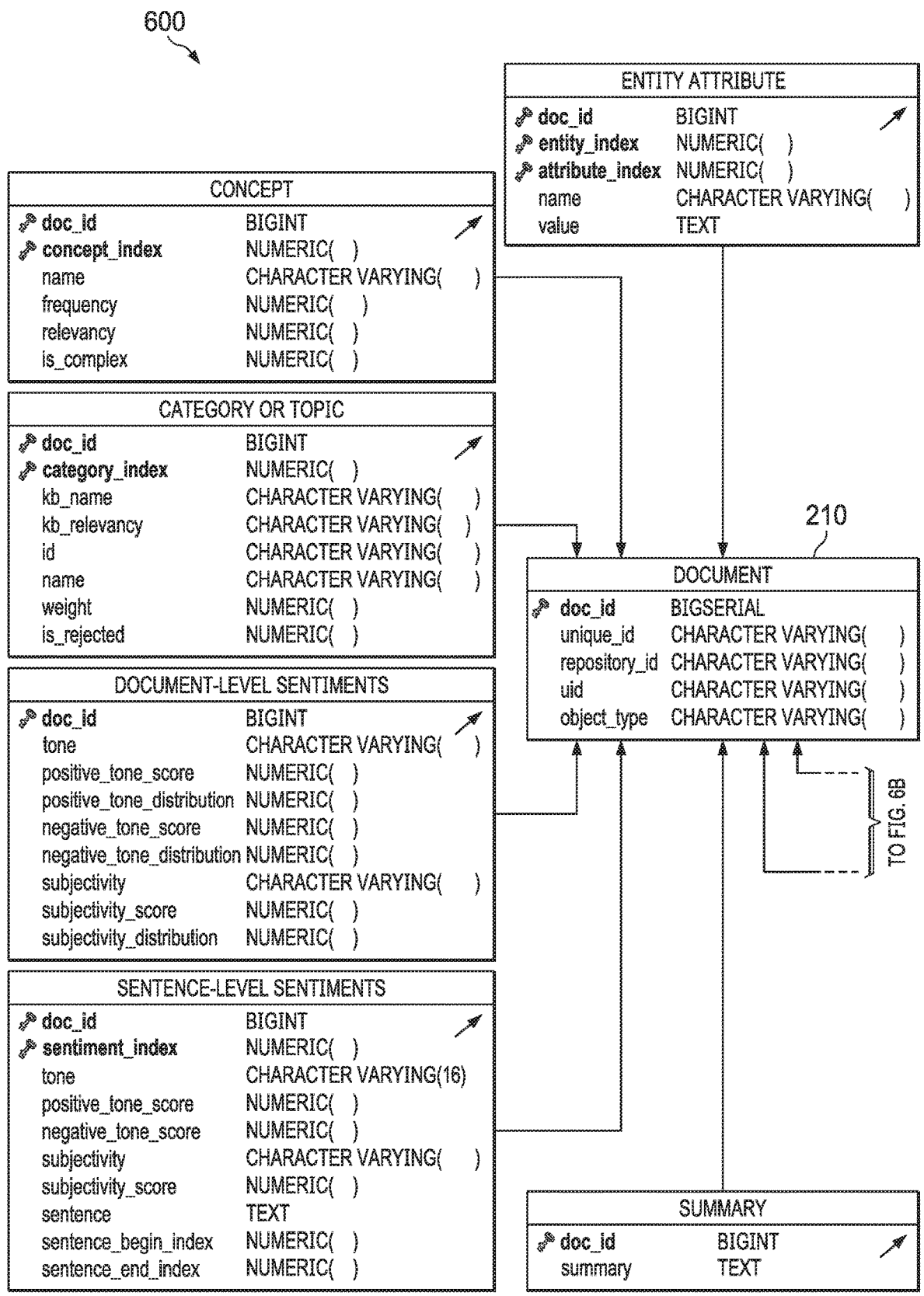

This example input file (which represents a crawler document or message) has several attribute-value pairs, including attributes "tweets," "hashtags," "urls," and "user mentions" and their corresponding values. These attribute-value pairs, referred to herein as editorial metadata, can be directly extracted from the input file and used to populate social media metadata tables such as those shown in FIG. 2. As illustrated in FIG. 2, social media data model 200 may define the structures of social media metadata tables 201, 203, 205, 207. In the example of FIG. 2, social media metadata tables 201, 203, 205, 207 storing editorial metadata extracted from social media content need not be persisted in the central repository. Rather, they can be mapped or otherwise associated with document table 210 which, as illustrated in FIGS. 6A-6B, is defined through single common data model 600. This allows the social media crawler to populate social media metadata tables 201, 203, 205, 207 (which, in one embodiment, can be, but are not required to be, stored in the central repository) with desired attribute-value pairs from the input file without having to change its operations and also allow other systems on the platform to access social media metadata tables 201, 203, 205, 207, as desired, through document table 210. In this example, document table 210 is associated with textual content extension table 212. Textual content extension table 212 can be configured for storing special attribute-value pairs (i.e., custom metadata) that maybe desired but not typically captured by the social media crawler.

In some embodiments, Web content may also be streamed into the message queue and/or kept in a staging area in a scalable distributed document database such as a MONGO database ("MongoDB"). MongoDB is a high availability, horizontally scalable cross-platform document-oriented database program that uses a document-oriented database model. MongoDB is known to those skilled in the art and thus is not further described herein.

Below is a non-limiting example of a JSON file that may be placed in the message queue of the stream-processing platform by a Web crawler.

```
{
    "jobId": "23",
    "groupName": "Magellan",
    "schemaName": "Nutch_23_webpage",
    "operation": "new",
    "objectID": "com.opentext.blogs:https/how-ai-and-opentext-magellan-can-solve-your-business-problems/",
    "pipeline_custom_properties": {
        "product": "magellan",
        "customer": "opentext",
        "type": "demo"
    }
}
```

Below is a non-limiting example of a JSON file that may be placed in a MONGO database by a Web crawler.

```
{
    "_id": "com.opentext.blogs:https/how-ai-and-opentext-magellan-can-solve-your-business-problems/",
    "fetchInterval": 2592000,
    "fetchTime": NumberLong(...) ,
    "markers": {
        "_updmrk_": "...",
        "dist": "0",
        "_injmrk_": "y",
        "_gnmrk_": null,
        "_ftcmrk_": null,
        "__prsmrk__": null
    },
    "metadata": {
        "meta_twitter:description": {
            "$binary": "...",
            "$type": "00"
        },
        "meta_charencodingforconversion": {
            "$binary": "...",
            "$type": "00"
        },
        "OriginalCharEncoding": {
            "$binary": "...",
            "$type": "00"
        },
        "meta__rs_": {
            "$binary": "...",
            "$type": "00"
        },
        "meta_twitter:title": {
            "$binary": "...",
            "$type": "00"
        },
        "meta_twitter:creator": {
            "$binary": "...",
            "$type": "00"
        },
        "meta_msapplication-tileimage": {
            "$binary": "...",
            "$type": "00"
        },
        "meta_viewport": {
            "$binary": "...",
            "$type": "00"
        },
        "_csh_": {
            "$binary": "...",
            "$type": "00"
        },
        "CharEncodingForConversion": {
            "$binary": "...",
            "$type": "00"
        },
        "meta_description": {
            "$binary": "...",
            "$type": "00"
        },
        "_rs_": {
            "$binary": "...",
            "$type": "00"
        },
        "meta_originalcharencoding": {
            "$binary": "...",
            "$type": "00"
        },
        "meta_twitter:site": {
            "$binary": "...",
            "$type": "00"
        },
        "meta_twitter:card": {
            "$binary": "...",
            "$type": "00"
        },
        "meta_generator": {
            "$binary": "...",
            "$type": "00"
        },
        "meta_twitter:image": {
            "$binary": "...",
            "$type": "00"
        },
        "meta_theme-color": {
            "$binary": "...",
            "$type": "00"
        }
    },
    "score": 1.0,
    "batchId": "...",
    "baseUrl": "https://blogs.opentext.com/how-ai-and-opentext-magellan-can-solve-your-business-problems/",
    "content": {
        "$binary": "...",
        "$type": "00"
    },
    "contentType": "text/html",
    "headers": {
        "X-Cache": "HIT: 1",
        "X-Type": "default",
        "Server": "nginx",
        "Connection": "close",
        "X-Pass-Why": "",
        "WPE-Backend": "apache",
        "Date": "Sat, 16 Feb 2019 18:37:27 GMT",
        "Accept-Ranges": "bytes",
        "X-UA-Compatible": "IE=edge",
        "Cache-Control": "max-age=600, must-revalidate",
        "X-Cacheable": "SHORT",
```

-continued

```
    "Vary": "Accept-Encoding,Cookie",
    "Expires": "max-age=2592000, public",
    "Content-Length": "86094",
    "Link": "<https://blogs.opentext.com/?p=37877>; rel=shortlink",
    "X-Cache-Group": "normal",
    "Content-Type": "text/html; charset=UTF-8"
    },
    "prevFetchTime": NumberLong(...),
    "protocolStatus": {
        "code": 1,
        "args": [ ],
        "lastModified": NumberLong(0)
    },
    "status": 2,
    "outlinks": {"..."
    },
    "parseStatus": {
        "majorCode": 1,
        "minorCode": 0,
        "args": [ ]
    },
    "signature": {
        "$binary": "...",
        "$type": "00"
    },
    "text": "How AI and OpenText Magellan can solve your business
problems - OpenText Blogs Visit OpenText.com Online ...",
    "title": "How AI and OpenText Magellan can solve your business
problems - OpenText Blogs",
    "inlinks": {"..."
    },
    "modifiedTime": NumberLong(0),
    "prevModifiedTime": NumberLong(0),
    "retriesSinceFetch": 0
}
```

Figure 3:
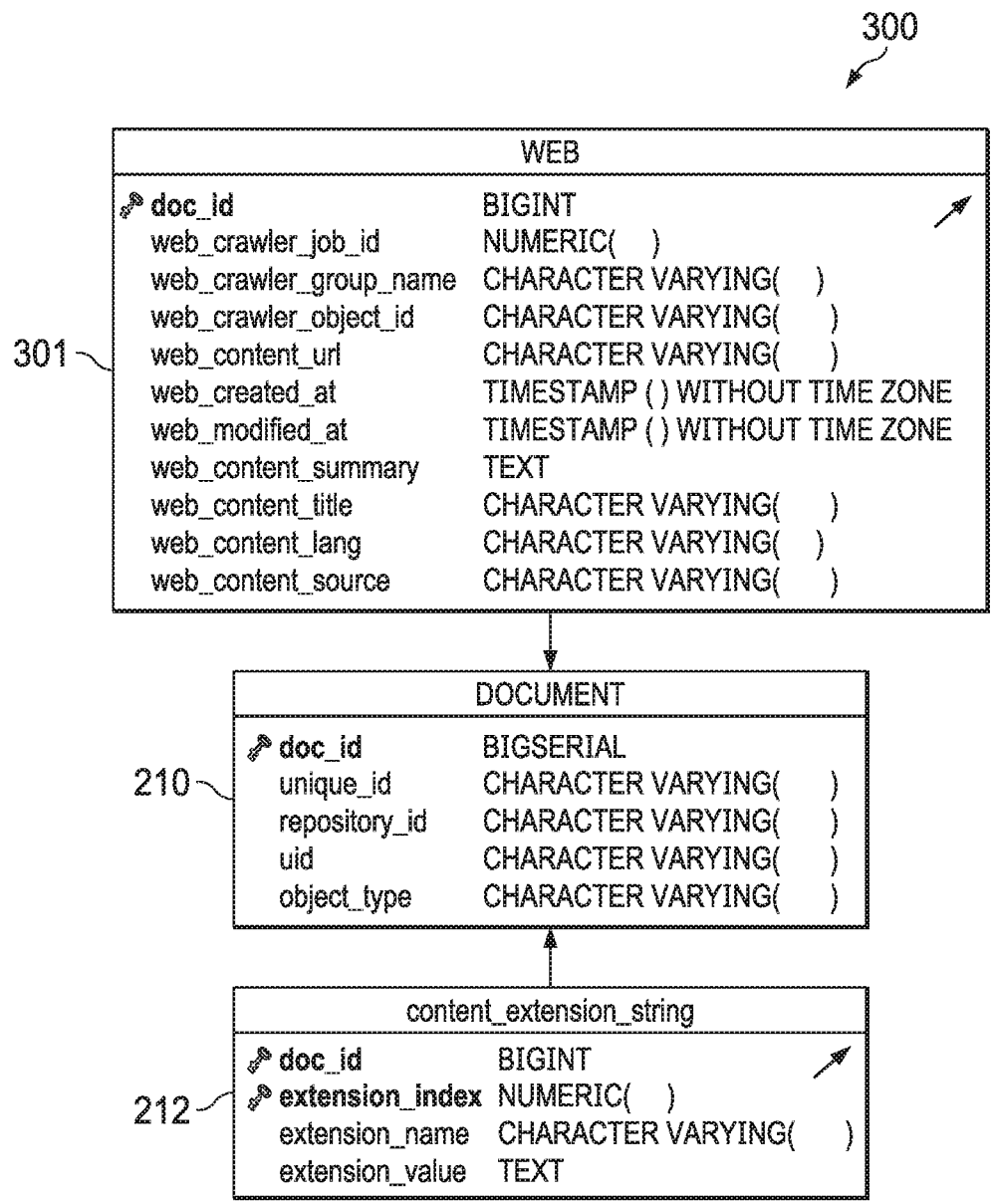
FIG. 3 depicts a diagrammatic representation of an example of a Web site data model for storing editorial metadata that can be extracted from Web content.

This example input file (which represents a crawler document or message) has several attribute-value pairs that maybe of interest (e.g., to a client entity of platform 100), for instance, the Web address where the content is found (e.g., "baseUrl"), the time when the content was created (e.g., "date"), the title of the content (e.g., "title"), the language of the content (e.g., "iso_language_code"), the source of the content (e.g., "source"), etc. Such editorial metadata of interest can be directly extracted from the input file and used to populate Web metadata tables such as Web metadata table 310 shown in FIG. 3. As illustrated in FIG. 3, Web site data model 300 may define the data structure of Web metadata table 310 (which, in one embodiment, can be, but is not required to be, stored in the central repository). In the example of FIG. 3, Web metadata table 310 storing editorial metadata extracted from Web content need not be persisted in the central repository. Rather, Web metadata table 310 can also be mapped or otherwise associated with document table 210. This allows the Web crawler to populate Web metadata table 310 with desired attribute-value pairs from the input file without having to change its operations and also allow other systems on the platform to access Web metadata table 310, as desired, through document table 210. In this example, document table 210 is associated with textual content extension table 212. Textual content extension table 212 can be configured for storing special attribute-value pairs (i.e., custom metadata) that maybe desired but not typically captured by the Web crawler.

In some embodiments, enterprise content or other types of structured content (e.g., a managed database object) stored in an enterprise repository such as an RDBMS can also be crawled (e.g., using a repository crawler) to obtain editorial metadata of interest. The editorial metadata of interest thus obtained from the structured content can be stored in enterprise content metadata tables such as those shown in FIG. 4.

Figure 4:
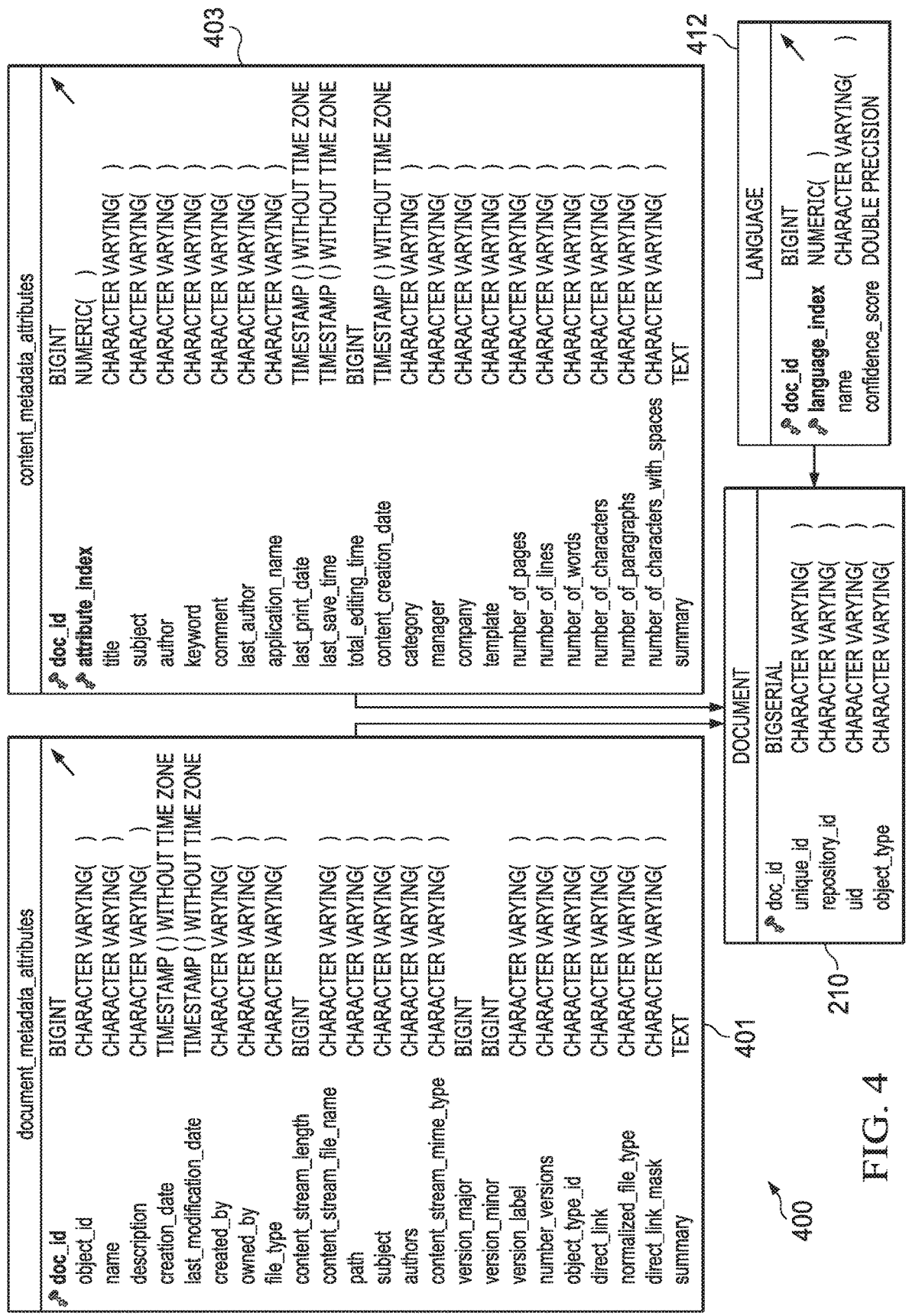
FIG. 4 depicts a diagrammatic representation of an example of an enterprise repository data model for storing editorial metadata that can be extracted from enterprise content.

In the example of FIG. 4, the structures of enterprise content metadata tables 401, 403 can be defined by enterprise data model 400, with enterprise content metadata table 401 configured for storing a set of attribute-value pairs at the document object level (e.g., file type, path, version number, owner, etc.) and enterprise content metadata table 403 configured for storing a set of attribute-value pairs at the content level (e.g., keyword, number of paragraphs, author, etc.). As illustrated in FIG. 4, enterprise content metadata tables 401, 403 can also be mapped or otherwise associated with document table 210. This allows the repository crawler to populate enterprise content metadata tables 401, 403 with desired attribute-value pairs from the enterprise repository without having to change its operations and also allow other systems on the platform to access enterprise content metadata tables 401, 403, as desired, through document table 210. Depending upon implementation, enterprise content metadata tables 401, 403 can be stored in the enterprise repository or in the central repository of the platform (e.g., platform 100). In this example, document table 210 is associated with language table 412 for storing language information which may be desired but not typically captured by the repository crawler.

Although various crawlers can be used to extract various types of editorial metadata from disparate contents, these crawler do not perform natural language processing (NLP) or have the necessary intelligence to understand or comprehend the meanings of words in the disparate contents. Often times, human opinions, emotions, intentions, and conclusions may not reflect in the literal words. This makes gaining rich context and valuable insight from disparate contents an extremely complex and daunting task. To this end, FIG. 5 depicts a diagrammatic representation of a process flow for determining/inferring semantic metadata from disparate contents 501 (e.g., social media data feeds, Web content, enterprise content, etc.) and persisting the semantic metadata in respective metadata tables 550 in central repository 580.

In the example of FIG. 5, disparate contents 501 are fed or otherwise provided to intelligent ingestion pipeline engine or text mining engine 510. Engine 510 is configured with basic and sophisticated NLP capabilities. NLP is a field of AI that provides the machines with the ability to read, understand, and derive meaning from natural human languages. Basic NLP capabilities of engine 510 can include language detection, tokenization and parsing, lemmatization/stemming, part-of-speech tagging, and identification of semantic relationships. Sophisticated NLP capabilities of engine 510 can include text mining functions such as concept extraction, categorization (also referred to as topic or classification), sentiment analysis, summarization, entity extraction, etc. Engine 510 may implement a pipeline architecture in which input pieces of content can be captured, organized, and routed through various processors (in a configurable order or pipelined fashion) to gain insights and contexts. This processing an begin with language detection which, in one embodiment, can be performed through a language detector from an NLP library of engine 510.

For conception extraction, engine 510 is operable to extract key concepts, including complex concepts. For example, concepts can be identified with an algorithm based on linguistic and statistical patterns (e.g., keywords and key phrases). These can include the most relevant noun(s) and phrase(s) for a given purpose. The extracted concepts can be weighted ranked such that they are outputted with relevancy ranking.

For categorization/topic/classification, engine 510 is operable to programmatically examine the input text and determine, according to a controlled vocabulary (a taxonomy—a scheme of classification), a best topic for the document and attach the topic to the document. For instance, a news article discusses that a president is going to visit a country of interest. Engine 510 is operable to programmatically examine the article, determine that this article concerns foreign affair and/or diplomacy, and add "foreign affair" and/or "diplomacy" as a piece of inferred, derived, or determined semantic metadata (e.g., "category=foreign affair" or "topic=diplomacy") to the article, even if the article itself does not literally contain "foreign affair" or "diplomacy." Downstream from text mining, these pieces of semantic metadata can be used across platform 500 in different ways for various reasons.

For instance, the vocabulary of engine 510 can be enhanced using ML techniques. As another example, a user of client device 570*a* can query data discovery and advanced analytics system 520 about diplomacy with the country of interest and find the news article through the semantic metadata (even though the news article does not mention "diplomacy"). Through data discovery and advanced analytics system 520, the user can quickly access, blend, store, and analyze data, identifying business trends, gaps, and relationships that they may never have known existed. Its frontend UI (e.g., frontend UI 121) can provide a drag-and-drop experience for exploring data in various ways (e.g., through set analysis with Venn diagrams, distribution charts, profiles and correlations, etc.). The discovery feature provides a range of data engineering and enrichment methods that enable users to aggregate and decode data, build expressions to create calculated fields, create numeric and quantile ranges, build parametric columns consisting of query-based values, and rank records.

Another example use of the semantic metadata can benefit a more advanced user such as a data scientist, data analyst, or ML modeler. As a non-limiting example, through a ML Designer Notebook UI on client device 570*b*, the more advanced user can access machine learning modeling and publication system 540 and incorporate the semantic metadata (e.g., foreign affair, diplomacy, etc.) in a ML model about current events taking place in the country of interest.

Yet another example use can benefit a knowledge worker, an operational user, or any user with no programming knowledge. For instance, through a dashboard on client device 570*n*, such a user can create a report about doing business in the country of interest. The report can utilize an ML model published through machine learning modeling and publication system 540 and/or an analysis by data discovery and advanced analytics system 520 (e.g., on a projected growth of an industry in the country of interest as affected by recent diplomatic efforts).

Engine 510 is capable of learning how to categorize or classify new content based on previous examples from which a model has been trained using ML (e.g., using taxonomies, training sets, and rules grouped in a categorization, topic, or classification knowledge base). There can be multiple categorization knowledge bases. Output from categorization can include a list of determined categories, topics, or classifications with relevancy rankings and a confidence score rating for each category, topic, or classification.

For sentiment analysis, engine 510 is operable to programmatically examine a piece of content (e.g., a post, a document, a tweet, an article, a message, etc.) in an even more fine-grained manner. For instance, for a given sentence in a document that describes a company releasing a new product, engine 510 is operable to analyze the sentence and determine whether the sentiment for the totality of the sentence is positive, negative, or neutral. Since engine 510 also extracts the named entities (e.g., company name, product name, etc.), the sentiment or tonality detected in a sentence by engine 510 can be associated with an entity or entities (e.g., the company and/or the product) in the sentence. At the entity level, multiple instances of a given entity can be combined to assess an overall sentiment value for the entity. In this way, what the document says about the product (e.g., a positive tone, a negative tone, or a neutral tone) at various levels (e.g., at the document level, the sentence level, the entity level, etc.) can be captured and leveraged by a content analysis (along with other documents relevant to the company and the product), for instance, for trend analysis and mood detection. Engine 510 can also leverage ML to learn how to determine a sentiment, for instance, by running a ML algorithm that utilizes input data and statistical models (e.g., NLP models or NLP classifiers) to predict an output value (e.g., a tone value).

Generally, summarization refers to the process of shortening a text document in order to create a summary with the major points of the original document. To perform summarization, engine 510 is operable to identify the most relevant sentences in a piece of content using, for instance, an output from the categorization, and generate a summary with the identified sentences. For instance, sentences with the highest relevancy can be identified, extracted, and included in the summary. This is a much more precise way to identify relevant content at the sentence level.

For entity extraction, engine 510 is operable to extract named entities. For instance, suppose a document describes that a specific company is releasing a new product. Based on linguistic rules and statistical patterns, engine 510 can extract the company's name, the new product name, etc. from the document. All occurrences of an entity type can also be extracted as sub entities. For synonyms, acronyms, and variations thereof, an authority file may be used. An authority file refers to a controlled vocabulary of terms and cross-reference terms that assists entity extraction to return additional relevant items and related metadata (e.g., geopolitical locations, person names, organization names, trademarks, events, etc.). There can be multiple authority files, each for a particular controlled vocabulary of terms and cross-reference terms. Other types of controlled vocabular and knowledge representation models such as those based on a thesaurus and/or ontology can also be used. Output from entity extraction can include a list of extracted entities with attributes and relevancy ranking (score). Since text mining is performed at the document level, the extracted named entities (e.g., the company's name and the new product name in this example) can be used to enrich the document. Further, engine 510 can learn how to determine an entity based on previous examples from which a model has been trained using ML. For example, suppose multiple documents mention a company name "Company X" following a product name "ABC," engine 510 may learn from these examples and determine to add an entity "Company X" for a new document that mentions the product name "ABC", even if the new document does not explicitly mention the company name "Company X." Engine 501 can also learn by example using n-gram. That is, a specific type of named entity can be inferred by the linguistic context in which this entity occurs. For example, with proper training material, engine 501 can process an input sentence like: "Last week, X, CEO of Y for the last five years, quit and plan to join Z next month" and learn to recognize X as a "people name" and Y, Z as company names based on the context.

Each of the text mining functions of engine 510 can be implemented as a processor in the content ingestion pipeline run by engine 510. For example, the sentiment analysis function can be implemented as a sentiment analysis processor, the summarization function can be implemented as a summarization processor, and so on. Although not shown in FIG. 5, the NLP text mining capabilities of engine 510 in some cases can be accessible through a text mining service (e.g., by making an API call to an API endpoint—a base universal resource locator (URL)— where an instance of the text mining service is hosted on a server computer of platform 500). The text mining service (which can be a type of Web services) accepts an eXtensible Markup Language (XML) post, JSON object, or any suitable RESTful payload encapsulation method that contains the text to be analyzed, as well as what text mining functions (e.g., summary, sentiment analysis, etc.) to be used. Example use cases can be found in U.S. patent Ser. No. 11,170,055, entitled "ARTIFICIAL INTELLIGENCE AUGUMENTED DOCUMENT CAPTURE AND PROCESSING SYSTEMS AND METHODS," and U.S. patent Ser. No. 11,017,179, entitled "REAL-TIME IN-CONTEXT SMART SUMMARIZER," both of which are incorporated by reference herein.

In some embodiments, outputs from these text mining functions (e.g., language, concepts, categories/topics/classifications, document-level sentiments, sentence-level sentiments, summaries, named entities, sub entities, etc.) can be captured in internal ingestion pipeline document 530. In some embodiments, this capturing process is performed utilizing uniform mapping schema 515. All internal ingestion pipeline documents conform to uniform mapping schema 515. Uniform mapping schema 515 defines a set of master metadata. Below is a non-limiting example of uniform mapping schema 515.

```xml
<?xml version="1.0" encoding="UTF-8"?>
<xs:schema attributeFormDefault="unqualified"
    elementFormDefault="qualified"
    targetNamespace="http://..."
    version="3.1"
    xmlns="http://opentext.com/.../Crawler/MasterMetadata"
    xmlns:xs="http://www.w3.org/2001/XMLSchema"
    xmlns:jaxb="http://java.sun.com/xml/ns/jaxb"
    xmlns:xjc="http://java.sun.com/xml/ns/jaxb/xjc"
    jaxb:extensionBindingPrefixes="xjc"
    jaxb:version="2.0">
    <xs:element name="document">
        <xs:complexType>
            <xs:all>
                <xs:element name="operation" type="xs:string" />
                <xs:element name="repositoryId" type="xs:string" />
                <xs:element name="uid" type="xs:string" />
                <xs:element name="objectType" type="xs:string" minOccurs="0" />
                <xs:element name="metadata" type="metadata" minOccurs="0" />
                <xs:element name="contentList" type="contentList" minOccurs="0" />
                <xs:element name="status" type="status" minOccurs="0" />
                <xs:element name="languageList" type="languageList" minOccurs="0" />
            </xs:all>
            <xs:anyAttribute processContents="skip" />
        </xs:complexType>
    </xs:element>
    <xs:complexType name="metadata">
        <xs:annotation>
            <xs:documentation>Metadata about the whole document.</xs:documentation>
        </xs:annotation>
        <xs:all>
            <xs:element name="attributes" type="attributes" />
            <xs:element name="acl" type="acl" minOccurs="0" maxOccurs="1" />
            <xs:element name="extensions" type="extensions" minOccurs="0" maxOccurs="1" />
        </xs:all>
    </xs:complexType>
    <xs:complexType name="attributes">
        <xs:annotation>
            <xs:documentation>Base attributes about the whole document.</xs:documentation>
        </xs:annotation>
        <xs:all>
            <xs:element name="objectId" type="xs:string" />
            <xs:element name="name" type="xs:string" />
            <xs:element name="description" type="xs:string" minOccurs="0" />
            <xs:element name="creationDate" type="xs:dateTime" minOccurs="0" />
            <xs:element name="lastModificationDate" type="xs:dateTime" minOccurs="0" />
            <xs:element name="createdBy" type="xs:string"
```

-continued

```
minOccurs="0" />
            <xs:element name="ownedBy" type="xs:string" minOccurs="0" />
            <xs:element name="fileType" type="xs:string" minOccurs="0" />
            <xs:element name="contentStreamLength" type="xs:long" minOccurs="0" />
            <xs:element name="contentStreamFileName" type="xs:string" minOccurs="0" />
            <xs:element name="path" type="xs:string" />
            <xs:element name="subject" type="xs:string" minOccurs="0" />
            <xs:element name="authors" type="xs:string" minOccurs="0" />
            <xs:element name="contentStreamMimeType" type="xs:string" minOccurs="0" />
            <xs:element name="versionMajor" type="xs:long" minOccurs="0" />
            <xs:element name="versionMinor" type="xs:long" minOccurs="0" />
            <xs:element name="versionLabel" type="xs:string" minOccurs="0" />
            <xs:element name="numberVersions" type="xs:string" minOccurs="0" />
            <xs:element name="objectTypeId" type="xs:string" minOccurs="0" />
            <xs:element name="directLink" type="xs:string" minOccurs="0" />
            <xs:element name="normalizedFileType" type="xs:string" minOccurs="0" />
            <xs:element name="directLinkMask" type="xs:string" minOccurs="0" />
            <xs:element name="summary" type="xs:string" minOccurs="0" />
        </xs:all>
    </xs:complexType>
    <xs:complexType name="acl">
        <xs:all>
            <xs:element name="hRead" type="xs:string" minOccurs="0" maxOccurs="1" />
            <xs:element name="hReadDeny" type="xs:string" minOccurs="0" maxOccurs="1" />
            <xs:element name="mRead" type="xs:string" minOccurs="0" maxOccurs="1" />
            <xs:element name="mReadDeny" type="xs:string" minOccurs="0" maxOccurs="1" />
            <xs:element name="lRead" type="xs:string" minOccurs="0" maxOccurs="1" />
            <xs:element name="lReadDeny" type="xs:string" minOccurs="0" maxOccurs="1" />
        </xs:all>
    </xs:complexType>
    <xs:complexType name="contentList">
        <xs:sequence>
            <xs:element name="content" type="content" maxOccurs="unbounded" />
        </xs:sequence>
    </xs:complexType>
    <xs:complexType name="content">
        <xs:annotation>
            <xs:documentation>Specific content of the document (can occur multiple times)</xs:documentation>
        </xs:annotation>
        <xs:all>
            <xs:element name="metadata" type="contentMetadata" minOccurs="0" />
            <xs:element name="file" type="file" />
            <xs:element name="text" type="xs:string" minOccurs="0" maxOccurs="1" />
        </xs:all>
        <xs:anyAttribute processContents="skip" />
    </xs:complexType>
    <xs:complexType name="contentMetadata">
        <xs:annotation>
            <xs:documentation>Metadata about specific content.</xs:documentation>
        </xs:annotation>
        <xs:all>
            <xs:element name="attributes" type="contentAttributes"
```

```
minOccurs="0" maxOccurs="1" />
            <xs:element name="extensions" type="extensions"
minOccurs="0" maxOccurs="1" />
        </xs:all>
    </xs:complexType>
    <xs:complexType name="contentAttributes">
        <xs:annotation>
            <xs:documentation>Base attributes for specific
content.</xs:documentation>
        </xs:annotation>
        <xs:choice minOccurs="0" maxOccurs="unbounded">
            <xs:element name="title" type="xs:string" />
            <xs:element name="subject" type="xs:string" />
            <xs:element name="author" type="xs:string" />
            <xs:element name="keywords" type="xs:string" />
            <xs:element name="comments" type="xs:string" />
            <xs:element name="lastAuthor" type="xs:string" />
            <xs:element name="applicationName" type="xs:string" />
            <xs:element name="lastPrintDate" type="xs:dateTime" />
            <xs:element name="lastSaveTime" type="xs:dateTime" />
            <xs:element name="totalEditingTime" type="xs:long" />
            <xs:element name="contentCreationDate" type="xs:dateTime"
/>
            <xs:element name="category" type="xs:string" />
            <xs:element name="manager" type="xs:string" />
            <xs:element name="company" type="xs:string" />
            <xs:element name="template" type="xs:string" />
            <xs:element name="numberOfPages" type="xs:string" />
            <xs:element name="numberOfLines" type="xs:string" />
            <xs:element name="numberOfWords" type="xs:string" />
            <xs:element name="numberOfCharacters" type="xs:string" />
            <xs:element name="numberOfParagraphs" type="xs:string" />
            <xs:element name="numberOfCharactersWithSpaces"
type="xs:string" />
            <xs:element name="summary" type="xs:string" />
        </xs:choice>
    </xs:complexType>
    <xs:complexType name="file">
        <xs:annotation>
            <xs:documentation>
                Pointer to file containing actual content.
                The textExtracted flag indicates if content is already
extracted (true) or if extraction should take place (false).
            </xs:documentation>
        </xs:annotation>
        <xs:all>
            <xs:element name="path" type="xs:string" />
            <xs:element name="textExtracted" type="xs:boolean" />
        </xs:all>
    </xs:complexType>
    <xs:complexType name="status">
        <xs:annotation>
            <xs:documentation>Status of the document, used by
components acting on document.</xs:documentation>
        </xs:annotation>
        <xs:all>
            <xs:element name="inError" type="xs:boolean" />
            <xs:element name="messageList" type="messageList" />
        </xs:all>
    </xs:complexType>
    <xs:complexType name="messageList">
        <xs:annotation>
            <xs:documentation>List of messages from components acting
on document.</xs:documentation>
        </xs:annotation>
        <xs:sequence>
            <xs:element name="message" type="xs:string"
maxOccurs="unbounded" />
        </xs:sequence>
    </xs:complexType>
    <xs:complexType name="languageList">
        <xs:annotation>
            <xs:documentation>List of languages for this document,
ordered by descending confidence level.</xs:documentation>
        </xs:annotation>
        <xs:sequence>
            <xs:element name="language" type="language"
maxOccurs="unbounded" />
        </xs:sequence>
```

```
        </xs:complexType>
        <xs:complexType name="language">
            <xs:annotation>
                <xs:documentation>Language entry, along with confidence
level (0.0 to 1.0).</xs:documentation>
            </xs:annotation>
            <xs:all>
                <xs:element name="name" type="xs:string" />
                <xs:element name="confidenceScore" type="xs:double" />
            </xs:all>
        </xs:complexType>
        <xs:complexType name="extensions">
            <xs:annotation>
                <xs:documentation>Extension point to add
information.</xs:documentation>
            </xs:annotation>
            <xs:sequence>
                <xs:any processContents="lax" namespace="##other"
minOccurs="0" maxOccurs="unbounded" />
            </xs:sequence>
        </xs:complexType>
</xs:schema>
```

Depending upon use case, the set of master metadata can be extended to include custom metadata. Below is a non-limiting example of a schema that defines a set of custom extensions.

```
<?xml version="1.0" encoding="UTF-8" standalone="yes"?>
<xs:schema xmlns:xs="http://www.w3.org/2001/XMLSchema"
    xmlns:tns="http://opentext.com/.../Util"
elementFormDefault="qualified"
    targetNamespace="..."
    version="1.0">
    <xs:element name="bool" type="tns:bool" />
    <xs:element name="byte" type="tns:byte" />
    <xs:element name="short" type="tns:short" />
    <xs:element name="int" type="tns:int" />
    <xs:element name="long" type="tns:long" />
    <xs:element name="float" type="tns:float" />
    <xs:element name="double" type="tns:double" />
    <xs:element name="date" type="tns:date" />
    <xs:element name="str" type="tns:str" />
    <xs:element name="list" type="tns:list" />
    <xs:element name="map" type="tns:map" />
    <xs:complexType name="bool">
        <xs:sequence />
        <xs:attribute name="value" type="xs:boolean" use="required" />
    </xs:complexType>
    <xs:complexType name="byte">
        <xs:sequence />
        <xs:attribute name="value" type="xs:byte" use="required" />
    </xs:complexType>
    <xs:complexType name="short">
        <xs:sequence />
        <xs:attribute name="value" type="xs:short" use="required" />
    </xs:complexType>
    <xs:complexType name="int">
        <xs:sequence />
        <xs:attribute name="value" type="xs:int" use="required" />
    </xs:complexType>
    <xs:complexType name="long">
        <xs:sequence />
        <xs:attribute name="value" type="xs:long" use="required" />
    </xs:complexType>
    <xs:complexType name="float">
        <xs:sequence />
        <xs:attribute name="value" type="xs:float" use="required" />
    </xs:complexType>
    <xs:complexType name="double">
        <xs:sequence />
        <xs:attribute name="value" type="xs:double" use="required" />
    </xs:complexType>
    <xs:complexType name="date">
        <xs:sequence />
        <xs:attribute name="value" type="xs:dateTime" />
```

```
        </xs:complexType>
        <xs:complexType name="str">
            <xs:sequence />
            <xs:attribute name="value" type="xs:string" />
        </xs:complexType>
        <xs:complexType name="list">
            <xs:sequence>
                <xs:any maxOccurs="unbounded" minOccurs="0"
namespace="##any"
                      processContents="lax" />
            </xs:sequence>
        </xs:complexType>
        <xs:complexType name="map">
            <xs:sequence>
                <xs:element maxOccurs="unbounded" minOccurs="0"
name="entry"
                      type="tns:entry" />
            </xs:sequence>
        </xs:complexType>
        <xs:complexType name="entry">
            <xs:sequence>
                <xs:element minOccurs="0" name="key" type="xs:anyType" />
                <xs:element minOccurs="0" name="value" type="xs:anyType"
/>
            </xs:sequence>
        </xs:complexType>
</xs:schema>
```

In one embodiment, uniform mapping schema 515 can be implemented in an XML Schema Definition (XSD) file. An XSD file contains definitional language describing elements in an XML document. Accordingly, in one embodiment, internal ingestion pipeline document 530 can be implemented as an XML document. A non-limiting example of internal ingestion pipeline document 530 in XML can be found in the accompanying Appendix A.

In some embodiments, internal ingestion pipeline document 530 is not persisted in central repository 580. Instead, metadata captured in internal ingestion pipeline document 530 (e.g., language, concepts, categories/topics/classifications, document-level sentiments, sentence-level sentiments, summaries, named entities, sub entities, etc.) can be mapped to metadata tables 550 using common data model 535 (regardless of the disparate nature of source contents). A non-limiting example of a common data model is shown in FIGS. 6A-6B.

Figure 7:
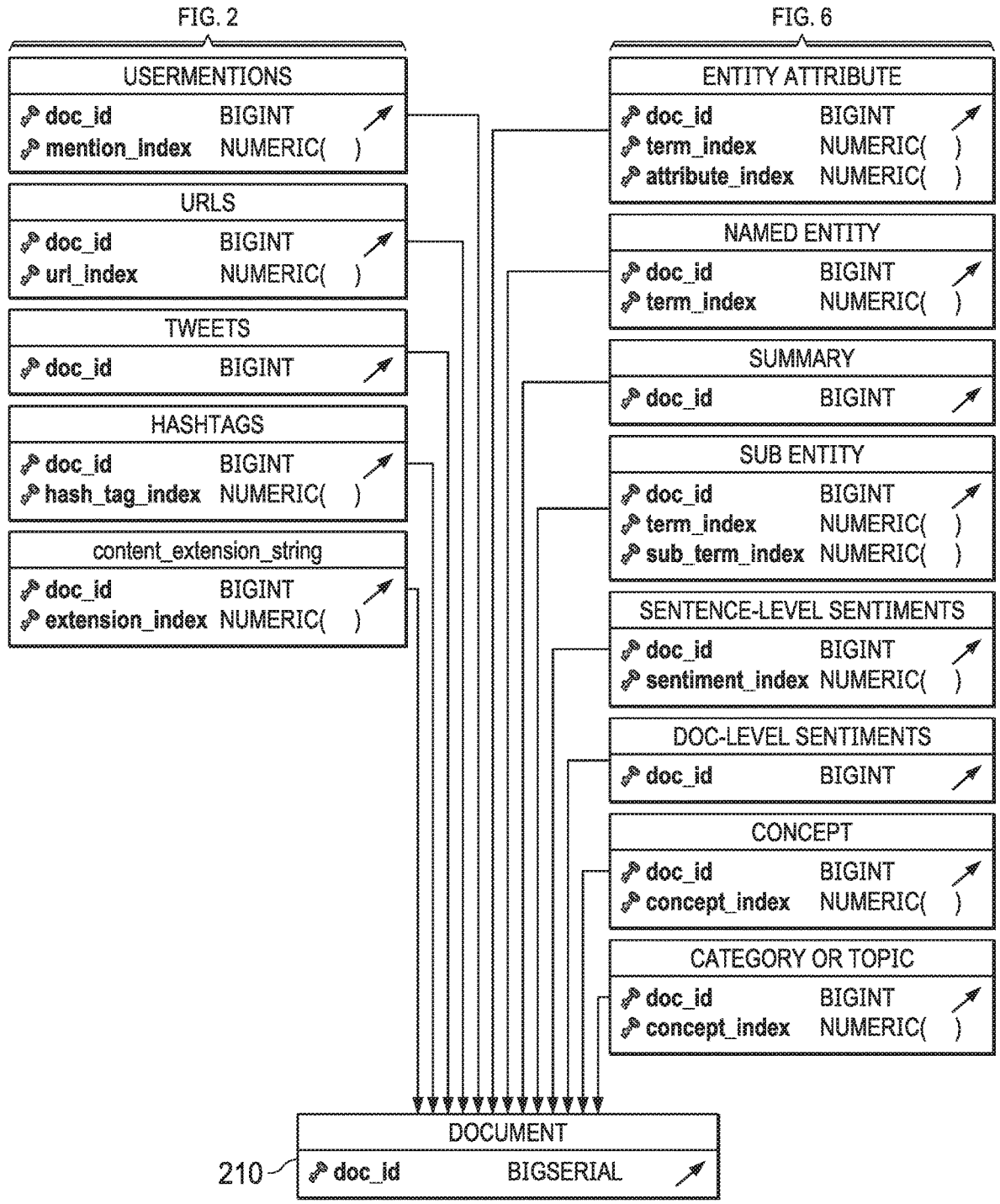
FIGS. 7-9 illustrate examples of a mapping schema that associates disparate metadata tables to an internal ingestion pipeline document according to some embodiments.
Figure 8:
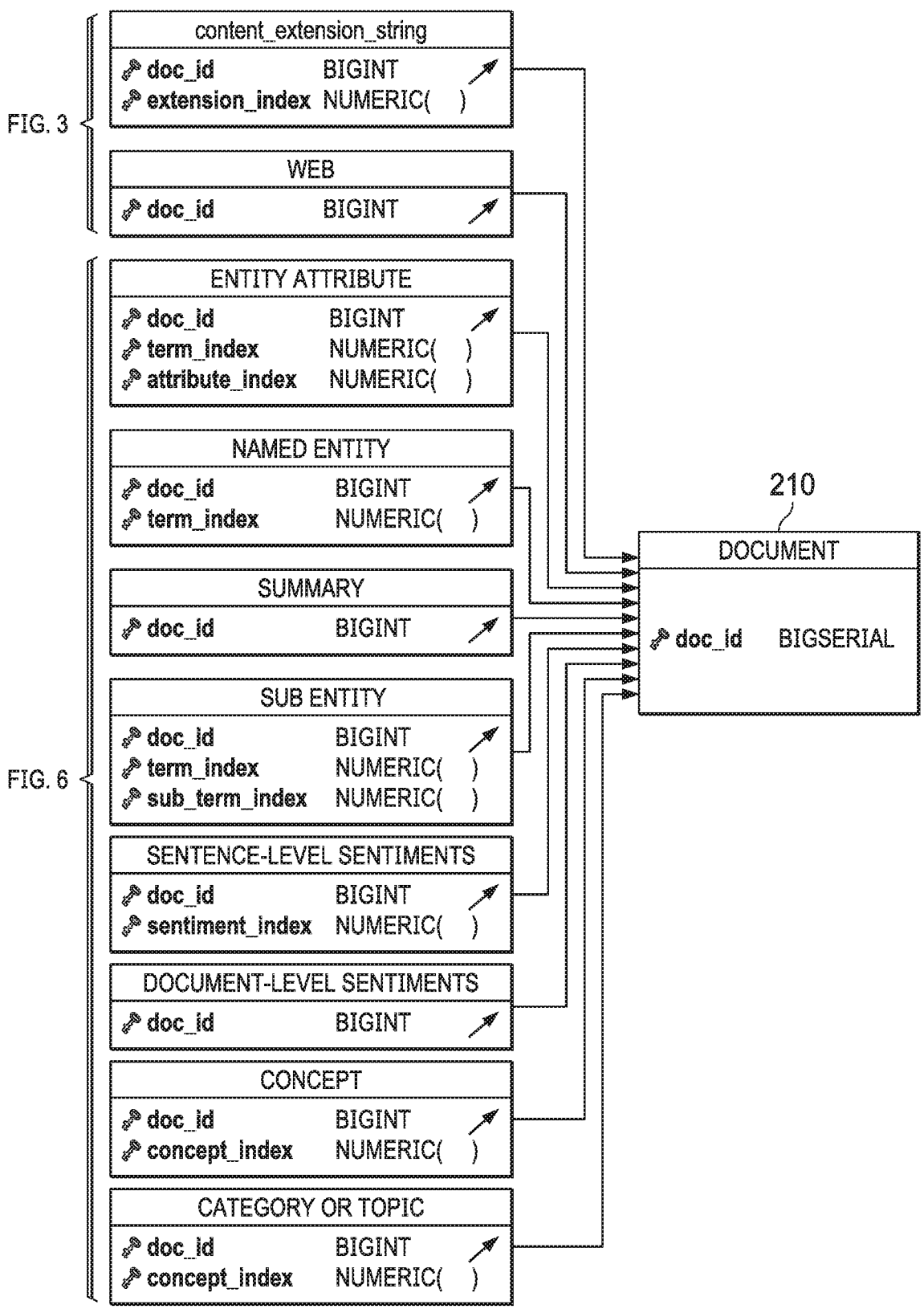
Figure 9:
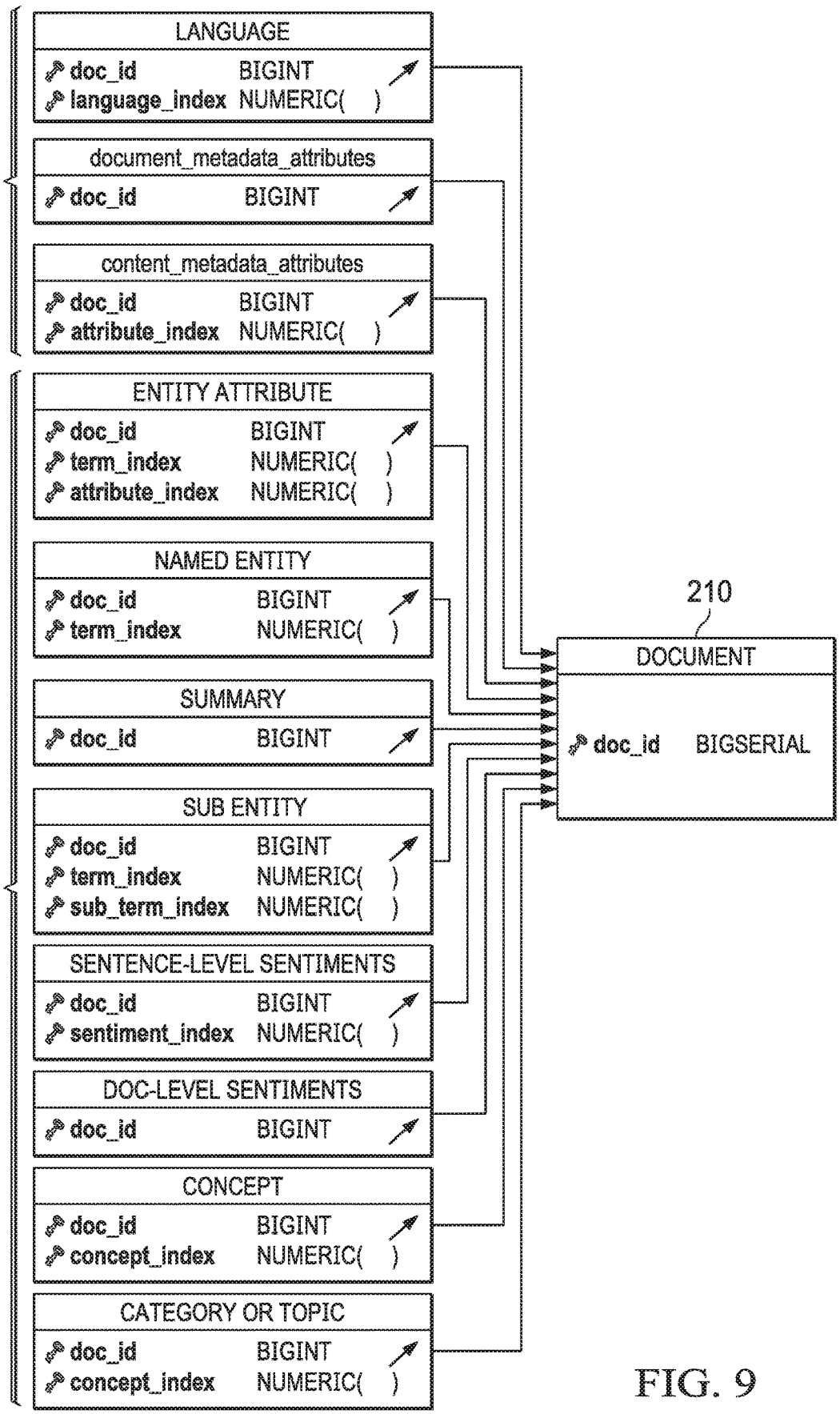

As illustrated in FIGS. 6A-6B, common data model 600 defines how metadata captured in internal ingestion pipeline document 530 should be mapped to various metadata tables, all of which are associated with document table 210. Document table 210, in turn, is configured for storing information about internal ingestion pipeline documents (e.g., internal ingestion pipeline document 530), each of which has a globally unique identifier. As illustrated in FIGS. 7-9, all of the metadata tables, including source-specific editorial metadata tables (e.g., social media metadata tables shown in FIG. 2, Web metadata table shown in FIG. 3, enterprise content metadata tables shown in FIG. 4) and semantic metadata tables conforming to the single common data model (e.g., metadata tables shown in FIGS. 6A-6B) are keyed to or otherwise associated with document table 210. This unique mapping schema allows disparate metadata tables to be associated with and through the same document according to some embodiments.

Figure 10:
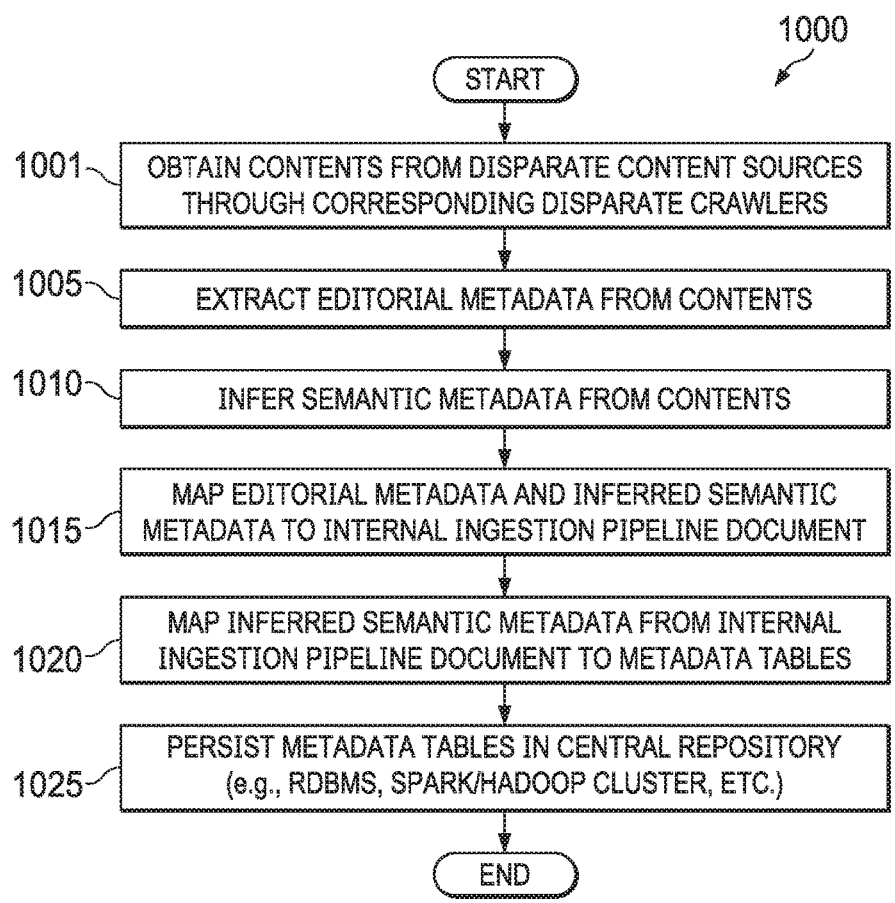
FIG. 10 is a flow chart illustrating an example of a method for processing contents from disparate content sources, mapping the disparate contents to a uniform mapping schema, and persisting metadata extracted/determined/inferred from the disparate contents in metadata tables according to some embodiments.

As exemplified in FIG. 10, this unique mapping schema can be realized in a method for processing disparate contents from disparate content sources, mapping the disparate contents to a uniform mapping schema, and persisting metadata extracted, determined, and/or inferred from the disparate contents in metadata tables. In some embodiments, method 1000 can include obtaining and/or receiving various types of contents (including those having various formats) from a plurality of disparate content sources (1001). As described above, this can be done using various crawlers particularly configured for communicating with the plurality of disparate content sources. Editorial metadata contained in disparate contents thus obtained and/or received from the plurality of disparate content sources can be extracted (1005). As described above, the extracted editorial metadata can reside in source-specific metadata tables. To augment editorial metadata and gain insights on the disparate contents, semantic metadata can be inferred, derived, or otherwise determined from the disparate contents (1010). As described above, this can include applying sophisticated NLP or text mining functions to extract desired semantic metadata such as language(s), concepts, categories/topics/classifications, document-level sentiments, sentence-level sentiments, summaries, named entities, sub entities, etc. The extracted metadata (including the editorial metadata and the semantic metadata) can be mapped to an internal ingestion pipeline document (1015). As described above, the internal ingestion pipeline document may conform to a uniform mapping schema which defines a set of master metadata and, where applicable, a set of custom extensions that can be captured in the internal ingestion pipeline document. While source-specific metadata tables need not be stored in a central repository, the semantic metadata generated through the content ingestion pipeline (which, as described above, is run by a specially programmed NLP processing or text mining engine) is to be persisted in the central repository. As described above, this can be achieved by mapping the semantic metadata generated through the content ingestion pipeline to metadata tables that conform to a single common data model of the central repository (1020). This allows the semantic metadata generated through the content ingestion pipeline to be persisted in the central repository and accessible through the metadata tables (1025). Depending upon implementation and/or use case, the central repository can be implemented in an RDBMS, HDFS, data lake, data store, etc. At this time, the disparate contents from disparate content sources are uniformly represented through the uniform mapping schema regardless of where they physically reside, and can be accessed through a common document table.

Accordingly, the platform leverages a unique mapping scheme that brings together textual contents from disparate sources (e.g., social media applications, Web sites, enterprise repositories, etc.) and insights mined from the contents. Through the ingestion pipeline, the incoming raw data is processed, examined, and tagged (or marked) based on various criteria (e.g., type, language, source, etc.). During this process, certain information can be extracted (e.g., editorial metadata) and/or removed (e.g., HTML tags). The remaining data of interest is analyzed and stored in metadata tables in accordance with the single common data model which defines the relationships between different columns in these tables (e.g., a shared property).

In some embodiments, the platform makes it possible to correlate unstructured textual content with hard (numerical) data. For example, social text (e.g., passages, comments, posts, etc.) that might come through social media applications and/or Web sites might be in six or seven languages. The platform can ingest such complex data and run a social media analysis to analyze the unstructured textual content, extract sentiment from the unstructured textual content and contextual information (e.g., what time a customer posted a comment, what concept or context was the comment—whether the comment was—toilet cleanliness or lost baggage at an airport, etc.), and map the output from the social media analysis to relevant numerical data.

The numerical data, in this case, can include approximated numerical data calculated from large datasets. That is, instead of calculating a median or something such as an average that is based on actually scanning all the data computed, the platform (e.g., through numerical content analyzer 122 and/or gateway 180) performs an approximation by programmatically examining the pieces of data distributed across the different nodes (in the distributed storage system) and assuming the average (e.g., a sum divided by the nodes). Such a numerical approximation computation can be performed by the gateway (e.g., gateway 180) responsive to a call or request from the advanced analytics system (e.g., numerical content analyzer 122, predictive analyzer 127, etc.). This numerical approximation computation is different from a conventional numerical analysis in which a computer first searches for certain rows, weighs each row, and then computes a median based on the weighted rows. Doing so is computationally very expensive. By contrast, computation needed by the platform to produce approximated numerical data is computationally efficient and can get a numerical answer that is "close enough." Operations performed by various systems across the platform can be monitored in real time or near real time (with operational delay only) through a dashboard monitoring system. An example of a suitable dashboard monitoring system is provided in U.S. Patent Application Publication No. US 2020/0117757 A1, entitled "REAL-TIME MONITORING AND REPORTING SYSTEMS AND METHODS FOR INFORMATION ACCESS PLATFORM," which is incorporated by reference herein.

The ability of the platform to take disparate contents from disparate sources (e.g., social media, Web sites, enterprise content, etc.) and combine them with analytical data, ML models, and comprehensive query, reporting, and dashboarding capabilities can have many practical applications in the real world and provide many technical advantages. For example, the content ingestion pipeline of the content analytics system running on the platform enables seamless incorporation of disparate contents into a single common data model for discovery, analysis, and visualization. This enables analytics (e.g., big data analytics) to be performed on unstructured data as well as combinations of structured and unstructured data. Further, the platform includes an enhanced gateway to a reliable and robust distributed cluster-computing framework. An example of such a gateway is described in U.S. Pat. No. 11,023,293, entitled "FLEXIBLE AND SCALABLE ARTIFICIAL INTELLIGENCE AND ANALYTICS PLATFORM WITH FLEXIBLE CONTENT STORAGE AND RETRIEVAL," which is incorporated by reference herein. As discussed above, this gateway can provide fast and efficient computation to approximate items from an extraordinarily large data set (e.g., hundreds and hundreds of gigabyte of data) in near real time.

Figure 11:
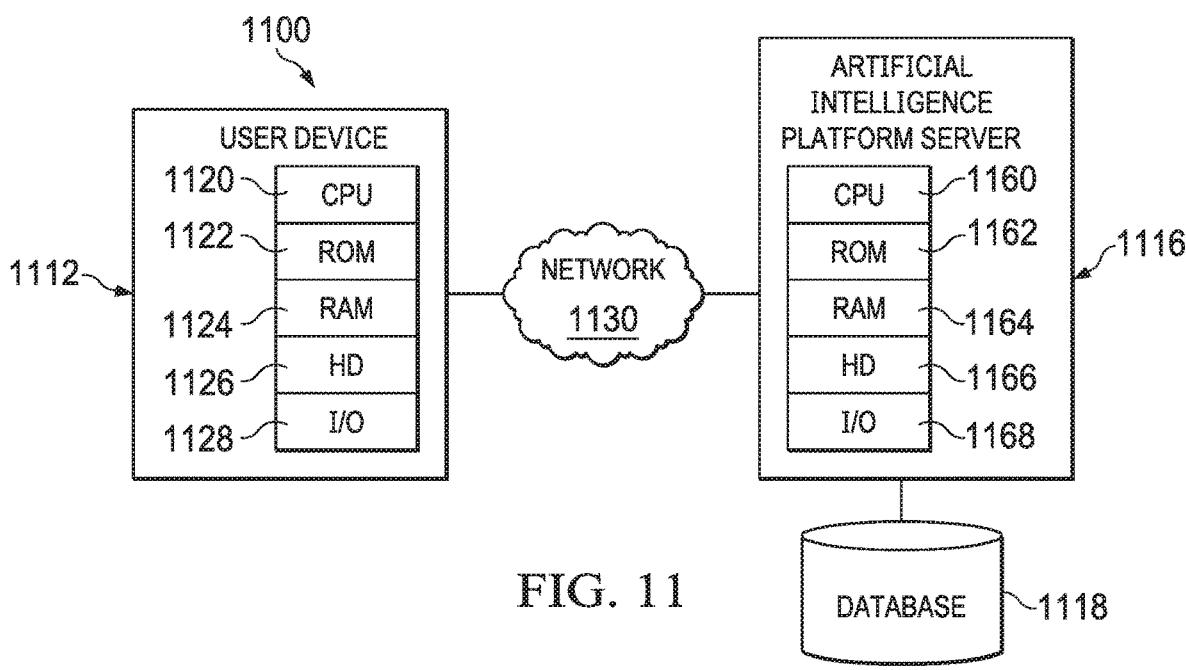
FIG. 11 depicts a diagrammatic representation of a distributed network computing environment where embodiments disclosed can be implemented.

FIG. 11 depicts a diagrammatic representation of a distributed network computing environment where embodiments disclosed can be implemented. In the example of FIG. 11, network computing environment 1100 may include network 1130 that can be bi-directionally coupled to user computer 1112 and AI platform server 1116 which, in this example, has access to ML model database 1118. Network 1130 may represent a combination of wired and wireless networks that network computing environment 1100 may utilize for various types of network communications known to those skilled in the art.

For the purpose of illustration, a single system is shown for each of user computer 1112 and AI platform server 1116. However, within each of user computer 1112 and AI platform server 1116, a plurality of computers (not shown) may be interconnected to each other over network 1130. For example, a plurality of user computers may be communicatively connected over network 1130 to one or more AI platform servers.

User computers 1112 may include a data processing system for communicating with AI platform server 1116. User computer 1112 can include central processing unit ("CPU") 1120, read-only memory ("ROM") 1122, random access memory ("RAM") 1124, hard drive ("HD") or storage memory 1126, and input/output device(s) ("I/O") 1128. I/O 1128 can include a keyboard, monitor, printer, electronic pointing device (e.g., mouse, trackball, stylus, etc.), or the like. User computer 1112 can include a desktop computer, a laptop computer, a personal digital assistant, a cellular phone, or nearly any device capable of communicating over a network. AI platform server 1116 may include CPU 1160, ROM 1162, RAM 1164, HD 1166, and I/O 1168. Many other alternative configurations are possible and known to skilled artisans.

Each of the computers in FIG. 11 may have more than one CPU, ROM, RAM, HD, I/O, or other hardware components. For the sake of brevity, each computer is illustrated as having one of each of the hardware components, even if more than one is used. Each of computers 1112 and 1116 is an example of a data processing system. ROM 1122 and 1162; RAM 1124 and 1164; HD 1126 and 1166; and data store 1118 can include media that can be read by CPU 1120 and/or 1160. Therefore, these types of memories include non-transitory computer-readable storage media. These memories may be internal or external to computers 1112 or 1116.

Portions of the methods described herein may be implemented in suitable software code that may reside within ROM 1122 or 1162; RAM 1124 or 1164; or HD 1126 or 1166. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Embodiments discussed herein can be implemented in a computer communicatively coupled to a network (for example, the Internet), another computer, or in a standalone computer. As is known to those skilled in the art, a suitable computer can include a CPU, ROM, RAM, HD, and I/O device(s). I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A system, comprising:
    a processor;
    a non-transitory computer-readable medium; and
    stored instructions translatable by the processor for implementing a text mining engine within a first subsystem, the text mining engine configured for ingesting, through a content ingestion pipeline, disparate contents obtained or received by disparate crawlers through real-time data feeds from disparate content sources, the ingesting the disparate contents comprising:
    inferring semantic metadata from the disparate contents;
    dynamically mapping the semantic metadata to an internal ingestion pipeline document, the internal ingestion pipeline document conforming to a uniform mapping schema that defines a set of master metadata of interest that can be captured in the internal ingestion pipeline document, wherein the dynamically mapping captures the semantic metadata or a portion thereof in the internal ingestion pipeline document in accordance with the uniform mapping schema; and
    mapping the semantic metadata or the portion thereof captured in the internal ingestion pipeline document to metadata tables in a central repository to thereby persist the semantic metadata or the portion thereof in the central repository, the metadata tables conforming to a single common data model of the central repository, the metadata tables accessible by a second subsystem configured for providing a Web service to a client device.

2. The system of claim 1, wherein the disparate contents comprise at least two types of textual content, audio content, image content, social media content, Web content, or enterprise content.

3. The system of claim 1, wherein the disparate data sources comprise at least two of a social media application, a social media site, a Web site, a Web application, a desktop application, a mobile application, an enterprise repository, a fileshare, an enterprise content management (ECM) system, an enterprise information management (EIM) system, an enterprise-class system, or an Internet-enabled device.

4. The system of claim 1, wherein the disparate crawlers are operable to extract the editorial metadata and store the editorial metadata in source-specific metadata tables, the source-specific metadata tables defined by source-specific schemas.

5. The system of claim 1, wherein the uniform mapping schema further defines a set of custom extensions for capturing custom attributes in the internal ingestion pipeline document.

6. The system of claim 1, wherein the single common data model defines a document table that associates the editorial metadata extracted from the disparate contents and the semantic metadata inferred from the disparate contents.

7. The system of claim 1, wherein the text mining engine is operable to infer the semantic metadata from the disparate contents utilizing a plurality of text mining functions, the plurality of text mining functions comprising language detection, concept extraction, categorization, topic, classification, sentiment analysis, summarization, or entity extraction.

8. A method, comprising:
    obtaining or receiving disparate contents through real-time data feeds from disparate content sources, the obtaining or receiving performed by disparate crawlers;
    ingesting the disparate contents through a content ingestion pipeline, the ingesting performed by a text mining engine of a first subsystem having a processor and a non-transitory computer-readable medium, the ingesting the disparate contents comprising:
    inferring semantic metadata from the disparate contents;
    dynamically mapping the semantic metadata to an internal ingestion pipeline document, the internal ingestion pipeline document conforming to a uniform mapping schema that defines a set of master metadata of interest that can be captured in the internal ingestion pipeline document, wherein the dynamically mapping captures the semantic metadata or a portion thereof in the internal ingestion pipeline document in accordance with the uniform mapping schema; and
    mapping the semantic metadata or the portion thereof captured in the internal ingestion pipeline document to metadata tables in a central repository to thereby persist the semantic metadata or the portion thereof in the central repository, the metadata tables conforming to a single common data model of the central repository, the metadata tables accessible by a second subsystem configured for providing a Web service to a client device.

9. The method according to claim 8, wherein the disparate contents comprise at least two types of textual content, audio content, image content, social media content, Web content, or enterprise content.

10. The method according to claim 8, wherein the disparate data sources comprise at least two of a social media application, a social media site, a Web site, a Web application, a desktop application, a mobile application, an enterprise repository, a fileshare, an enterprise content management (ECM) system, an enterprise information management (EIM) system, an enterprise-class system, or an Internet-enabled device.

11. The method according to claim 8, wherein the disparate crawlers are operable to extract the editorial metadata and store the editorial metadata in source-specific metadata tables, the source-specific metadata tables defined by source-specific schemas.

12. The method according to claim 8, wherein the uniform mapping schema further defines a set of custom extensions for capturing custom attributes in the internal ingestion pipeline document.

13. The method according to claim 8, wherein the single common data model defines a document table that associates the editorial metadata extracted from the disparate contents and the semantic metadata inferred from the disparate contents.

14. The method according to claim 8, wherein the text mining engine is operable to infer the semantic metadata from the disparate contents utilizing a plurality of text mining functions, the plurality of text mining functions comprising language detection, concept extraction, categorization, topic, classification, sentiment analysis, summarization, or entity extraction.

15. A computer program product comprising a non-transitory computer-readable medium storing instructions translatable by a processor for ingesting disparate contents through a content ingestion pipeline, the disparate contents obtained or received by disparate crawlers through real-time data feeds from disparate content sources, the content ingestion pipeline operated by a text mining engine of a first subsystem, the ingesting the disparate contents comprising:

inferring semantic metadata from the disparate contents;

dynamically mapping the semantic metadata to an internal ingestion pipeline document, the internal ingestion pipeline document conforming to a uniform mapping schema that defines a set of master metadata of interest that can be captured in the internal ingestion pipeline document, wherein the dynamically mapping captures the semantic metadata or a portion thereof in the internal ingestion pipeline document in accordance with the uniform mapping schema; and mapping the semantic metadata or the portion thereof captured in the internal ingestion pipeline document to metadata tables in a central repository to thereby persist the semantic metadata or the portion thereof in the central repository, the metadata tables conforming to a single common data model of the central repository, the metadata tables accessible by a second subsystem configured for providing a Web service to a client device.

16. The computer program product of claim 15, wherein the disparate contents comprise at least two types of textual content, audio content, image content, social media content, Web content, or enterprise content.

17. The computer program product of claim 15, wherein the disparate data sources comprise at least two of a social media application, a social media site, a Web site, a Web application, a desktop application, a mobile application, an enterprise repository, a fileshare, an enterprise content management (ECM) system, an enterprise information management (EIM) system, an enterprise-class system, or an Internet-enabled device.

18. The computer program product of claim 15, wherein the uniform mapping schema further defines a set of custom extensions for capturing custom attributes in the internal ingestion pipeline document.

19. The computer program product of claim 15, wherein the single common data model defines a document table that associates the editorial metadata extracted from the disparate contents and the semantic metadata inferred from the disparate contents.

20. The computer program product of claim 15, wherein the text mining engine is operable to infer the semantic metadata from the disparate contents utilizing a plurality of text mining functions, the plurality of text mining functions comprising language detection, concept extraction, categorization, topic, classification, sentiment analysis, summarization, or entity extraction.

* * * * *